(12) United States Patent
Nix et al.

(10) Patent No.: US 10,922,563 B2
(45) Date of Patent: Feb. 16, 2021

(54) VEHICULAR CONTROL SYSTEM

(71) Applicant: Magna Electronics Inc., Auburn Hills, MI (US)

(72) Inventors: Axel Nix, Birmingham, MI (US); Joern Ihlenburg, Berlin (DE); Nazar F. Bally, Sterling Heights, MI (US); Duane W. Gebauer, Gregory, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/724,484

(22) Filed: Dec. 23, 2019

(65) Prior Publication Data
US 2020/0125867 A1 Apr. 23, 2020

Related U.S. Application Data

(63) Continuation of application No. 16/117,172, filed on Aug. 30, 2018, now Pat. No. 10,515,279, which is a (Continued)

(51) Int. Cl.
*G06K 9/00* (2006.01)

(52) U.S. Cl.
CPC ................ *G06K 9/00805* (2013.01)

(58) Field of Classification Search
CPC ..... G09G 2320/0271; G09G 2330/021; G09G 2360/16; G09G 2300/0861; G09G 2320/0247; G09G 3/3241; G09G 2300/0452; G09G 2300/0842; G09G 2310/0235; G09G 2310/0248;
(Continued)

(56) References Cited

U.S. PATENT DOCUMENTS

| 4,443,769 A | 4/1984 | Aschwanden et al. |
| 4,485,398 A | 11/1984 | Chapin, Jr. et al. |

(Continued)

FOREIGN PATENT DOCUMENTS

| EP | 2247047 A1 | 11/2010 |
| FR | 2921535 A1 | 3/2009 |
| WO | 2010110957 A2 | 9/2010 |

OTHER PUBLICATIONS

Foresight CCTV, Inc., "Two Video with Alarm Signals Transmission Set", 2003.

*Primary Examiner* — Samira Monshi
(74) *Attorney, Agent, or Firm* — Honigman LLP

(57) ABSTRACT

A vehicular control system includes an electronic control unit (ECU) and a plurality of cameras including side-viewing cameras and a front or forward-viewing camera and/or a rearward-viewing camera. The cameras connect with the ECU via respective coaxial cables. Image data captured by the cameras is converted at a respective LVDS serializer to a respective image signal and is carried to the ECU via the respective coaxial cable by LVDS. The image signals are de-serialized at the respective LVDS de-serializer of the ECU. The image processor of the ECU may process a de-serialized image signal to detect a vehicle present in the field of view of the front camera, whereby, responsive to determination that the equipped vehicle and the detected vehicle may collide, the system may, at least in part, control a braking system of the equipped vehicle.

89 Claims, 17 Drawing Sheets

Related U.S. Application Data continuation of application No. 13/894,870, filed on May 15, 2013, now Pat. No. 10,089,537.

(60) Provisional application No. 61/699,498, filed on Sep. 11, 2012, provisional application No. 61/682,486, filed on Aug. 13, 2012, provisional application No. 61/648,744, filed on May 18, 2012.

(58) Field of Classification Search
CPC ... G09G 2310/0251; G09G 2310/0297; G09G 2320/0261; G09G 2320/0276; G09G 2320/0626; G09G 2320/064; G09G 2320/066; G09G 3/2014; G09G 3/22; G09G 3/325; G09G 3/3266; G09G 3/3283; G09G 3/2022; G09G 3/3426; G09G 2320/0233; G09G 2320/0285; G09G 2320/029; G09G 2320/041; G09G 2320/043; G09G 2320/0646; G09G 2320/0666; G09G 2320/0693; G09G 2330/02; G09G 2330/028; G09G 2360/145; G09G 3/3225; G09G 3/3275; G09G 3/3413; G09G 3/342; G09G 5/006; G09G 2300/043; G09G 2320/0266; G09G 2320/0673; G09G 2320/08; G09G 2340/06; G09G 3/2018; G09G 3/2051; G09G 3/2922; G09G 3/293; G09G 3/294; G09G 3/3233; G09G 3/3258; G09G 3/3406; H04N 1/4092; H04N 1/56; H04N 5/21; H04N 5/253; H04N 17/002; H04N 3/36; H04N 5/20; H04N 5/202; H04N 5/2256; H04N 5/243; H04N 9/11
See application file for complete search history.

(56) References Cited

U.S. PATENT DOCUMENTS

| | | |
|---|---|---|
| 4,720,790 A | 1/1988 | Miki et al. |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |

(56) References Cited

U.S. PATENT DOCUMENTS

| | | |
|---|---|---|
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A | 9/2000 | Baker |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,605,775 B1 | 8/2003 | Seeber et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,338,177 B2 | 3/2008 | Lynam |
| 7,365,769 B1 | 4/2008 | Mager |
| 7,370,983 B2 | 5/2008 | DeWind et al. |
| 7,381,089 B2 | 6/2008 | Hosler, Sr. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,581,859 B2 | 9/2009 | Lynam |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,777,611 B2 | 8/2010 | Desai |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,952,490 B2 | 5/2011 | Fechner et al. |
| 7,965,336 B2 | 6/2011 | Bingle et al. |

(56) References Cited

U.S. PATENT DOCUMENTS

| | | |
|---|---|---|
| 8,013,780 B2 | 9/2011 | Lynam |
| 8,027,029 B2 | 9/2011 | Lu et al. |
| 8,058,977 B2 | 11/2011 | Lynam |
| 8,090,976 B2 | 1/2012 | Maciver et al. |
| 8,340,866 B2 | 12/2012 | Hanzawa et al. |
| 8,849,495 B2 | 9/2014 | Chundrik, Jr. et al. |
| 8,908,039 B2 | 12/2014 | De Wind et al. |
| 9,019,090 B2 | 4/2015 | Weller et al. |
| 9,041,806 B2 | 5/2015 | Baur et al. |
| 9,090,234 B2 | 7/2015 | Johnson et al. |
| 9,092,986 B2 | 7/2015 | Salomonsson et al. |
| 9,146,898 B2 | 9/2015 | Ihlenburg et al. |
| 9,210,307 B2 | 12/2015 | Gebauer et al. |
| 9,900,490 B2 | 2/2018 | Ihlenburg et al. |
| 10,515,279 B2 | 12/2019 | Nix et al. |
| 2002/0015153 A1 | 2/2002 | Downs |
| 2002/0037054 A1 | 3/2002 | Schurig |
| 2002/0044065 A1 | 4/2002 | Quist et al. |
| 2002/0113873 A1 | 8/2002 | Williams |
| 2002/0149679 A1 | 10/2002 | Deangelis et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0078389 A1 | 4/2005 | Kulas et al. |
| 2005/0134983 A1 | 6/2005 | Lynam |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0061008 A1 | 3/2006 | Kamer et al. |
| 2006/0072011 A1 | 4/2006 | Okada |
| 2006/0091813 A1 | 5/2006 | Stam et al. |
| 2006/0103727 A1 | 5/2006 | Tseng |
| 2006/0164221 A1 | 7/2006 | Jensen |
| 2006/0212624 A1 | 9/2006 | Kim |
| 2006/0250501 A1 | 11/2006 | Wildmann et al. |
| 2006/0254805 A1 | 11/2006 | Scherer et al. |
| 2006/0255920 A1 | 11/2006 | Maeda et al. |
| 2006/0290479 A1 | 12/2006 | Akatsuka et al. |
| 2007/0103313 A1 | 5/2007 | Washington |
| 2007/0104476 A1 | 5/2007 | Yasutomi et al. |
| 2007/0257923 A1 | 11/2007 | Whitby-Strevens |
| 2008/0063129 A1 | 3/2008 | Voutilainen |
| 2008/0150814 A1 | 6/2008 | Hedou et al. |
| 2009/0024756 A1 | 1/2009 | Spalla et al. |
| 2009/0093938 A1 | 4/2009 | Isaji et al. |
| 2009/0113509 A1 | 4/2009 | Tseng et al. |
| 2009/0171559 A1 | 7/2009 | Lehtiniemi et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2009/0295181 A1 | 12/2009 | Lawlor et al. |
| 2010/0020170 A1 | 1/2010 | Higgins-Luthman et al. |
| 2010/0097469 A1 | 4/2010 | Blank et al. |
| 2010/0097519 A1 | 4/2010 | Byrne et al. |
| 2010/0118145 A1 | 5/2010 | Betham et al. |
| 2010/0228437 A1 | 9/2010 | Hanzawa et al. |
| 2010/0296519 A1 | 11/2010 | Jones |
| 2011/0115615 A1 | 5/2011 | Luo et al. |
| 2011/0141381 A1 | 6/2011 | Minikey, Jr. et al. |
| 2011/0157309 A1 | 6/2011 | Bennett et al. |
| 2011/0193961 A1 | 8/2011 | Peterson |
| 2011/0224978 A1 | 9/2011 | Sawada |
| 2011/0257973 A1 | 10/2011 | Chutorash et al. |
| 2011/0286544 A1 | 11/2011 | Avudainayagam et al. |
| 2012/0044066 A1 | 2/2012 | Mauderer et al. |
| 2012/0050550 A1 | 3/2012 | Oba et al. |
| 2012/0062743 A1 | 3/2012 | Lynam et al. |
| 2012/0069184 A1 | 3/2012 | Hottmann |
| 2012/0140073 A1* | 6/2012 | Ohta .................. B60R 25/1012 348/148 |
| 2012/0154591 A1 | 6/2012 | Baur et al. |
| 2012/0186447 A1 | 7/2012 | Hodgson et al. |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0287140 A1 | 11/2012 | Lin et al. |
| 2012/0303222 A1 | 11/2012 | Cooprider et al. |
| 2013/0066542 A1* | 3/2013 | Chung .................. G08G 1/04 701/119 |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131918 A1 | 5/2013 | Hahne |
| 2013/0134964 A1 | 5/2013 | Ahrentorp et al. |
| 2013/0141578 A1 | 6/2013 | Chundrlik, Jr. et al. |
| 2013/0187445 A1 | 7/2013 | Mutzabaugh |
| 2013/0222593 A1 | 8/2013 | Byrne et al. |
| 2013/0278769 A1 | 10/2013 | Nix et al. |
| 2013/0314503 A1 | 11/2013 | Nix et al. |
| 2013/0328672 A1 | 12/2013 | Sesti et al. |
| 2014/0009633 A1 | 1/2014 | Chopra et al. |
| 2014/0067206 A1 | 3/2014 | Pflug |
| 2014/0152778 A1 | 6/2014 | Ihlenburg et al. |
| 2014/0156157 A1 | 6/2014 | Johnson et al. |
| 2014/0160291 A1 | 6/2014 | Schaffner |
| 2014/0176711 A1 | 6/2014 | Kirchner et al. |
| 2014/0218529 A1 | 8/2014 | Mahmoud et al. |
| 2014/0218535 A1 | 8/2014 | Ihlenburg et al. |
| 2014/0222280 A1 | 8/2014 | Salomonsson et al. |
| 2014/0247355 A1 | 9/2014 | Ihlenburg |
| 2014/0313339 A1 | 10/2014 | Diessner |
| 2014/0340510 A1 | 11/2014 | Ihlenburg et al. |
| 2014/0362209 A1 | 12/2014 | Ziegenspeck et al. |
| 2014/0373345 A1 | 12/2014 | Steigerwald |
| 2014/0379233 A1 | 12/2014 | Chundrlik, Jr. et al. |
| 2015/0042807 A1 | 2/2015 | Ihlenburg et al. |
| 2015/0156383 A1 | 6/2015 | Biemer et al. |
| 2015/0222795 A1 | 8/2015 | Sauer et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |

* cited by examiner

Uncorrected raw view

Corrected Wide View

Normal View

Top View

Left and right extraction for crossing traffic detection

Corrected Wide View

Cylindrical Dewarp

Normal View

VEHICULAR CONTROL SYSTEM

CROSS REFERENCE TO RELATED APPLICATIONS

The present application is a continuation of U.S. patent application Ser. No. 16/117,172, filed Aug. 30, 2018, now U.S. Pat. No. 10,515,279, which is a continuation of U.S. patent application Ser. No. 13/894,870, filed May 15, 2013, now U.S. Pat. No. 10,089,537, which claims the filing benefit of U.S. provisional application Ser. No. 61/699,498, filed Sep. 11, 2012, Ser. No. 61/682,486, filed Aug. 13, 2012, and Ser. No. 61/648,744, filed May 18, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes two or more cameras to capture images exterior of the vehicle (such as forwardly and rearwardly of the vehicle), and provides the communication/data signals, including camera data or image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle.

According to an aspect of the present invention, a vision system for a vehicle includes multiple cameras or image sensors disposed at a vehicle and having respective fields of view exterior of the vehicle, and an image processor operable to process data transmitted by the cameras. The vision system includes a forward facing camera module (having image processing circuitry incorporated therein) and a rearward facing vision camera (for capturing video image data that is displayed on a display of the vehicle for viewing by the driver of the vehicle during a reversing maneuver). The video output of the rearward facing vision camera is fed to the forward facing camera module and to the display, so the video images can be viewed by the driver of the vehicle and can be processed by an image processor of the forward facing camera module. The video image data captured by the rearward facing camera may be fed to an amplifier of the forward facing camera module and an output of the amplifier is fed to a decoder of the forward facing camera module and an output of the decoder is fed to the image processor of the forward facing camera module. The vision system may provide a variety of functions by utilizing captured image data from one or more of the cameras at the vehicle, such as a forward facing camera, a rearward facing camera, side view cameras and/or a forward facing windshield mounted camera (having a field of view through the windshield of the vehicle).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from the vehicle cameras and may provide a displayed image that is representative of the subject vehicle (such as for a top down or bird's eye or surround view, such as discussed below). The vision and display system may utilize aspects of the systems described in U.S. Pat. No. 7,855,755 and U.S. patent application Ser. No. 12/405,558, filed Mar. 17, 2009, now U.S. Pat. No. 9,019,090, which are hereby incorporated herein by reference in their entireties.

Figure 1:
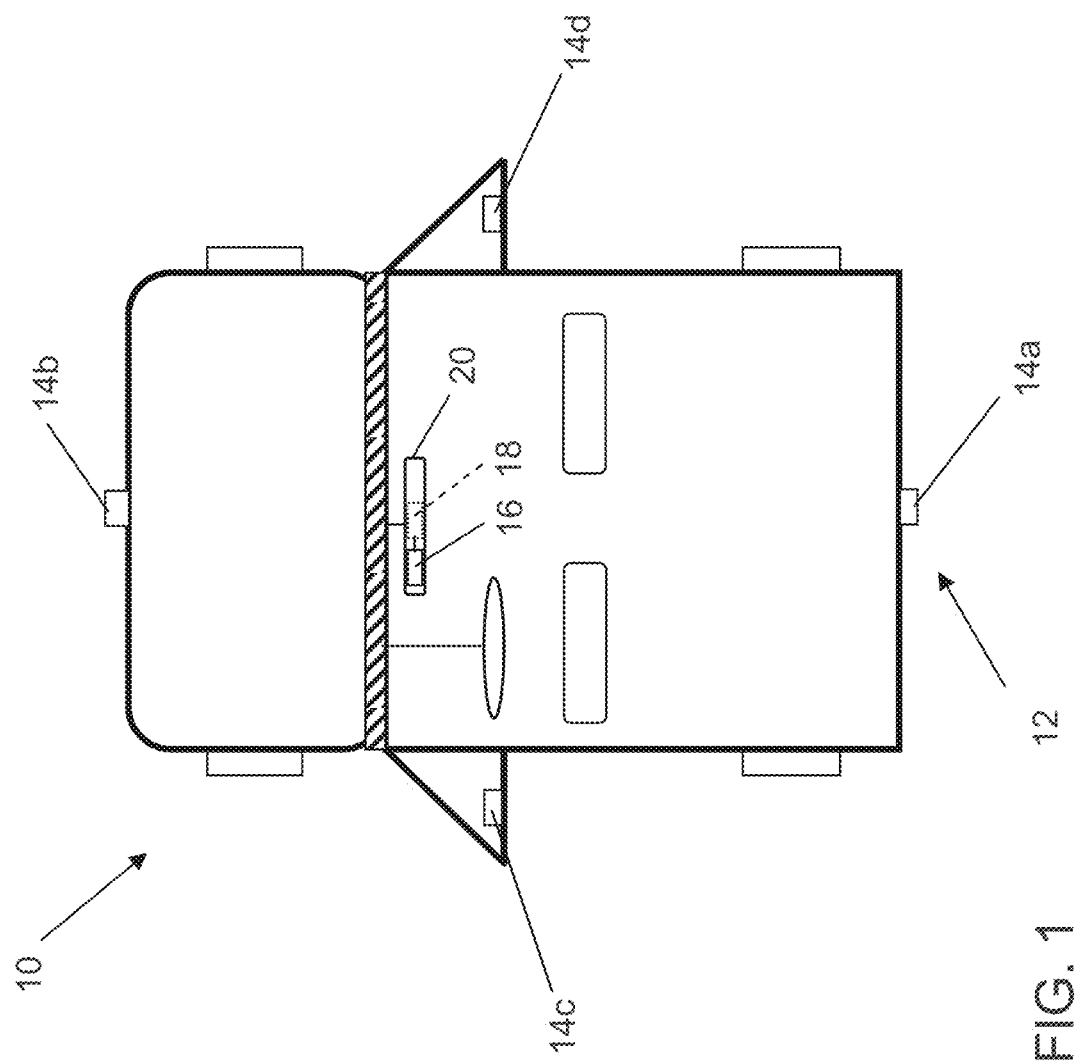
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

Figure 2:
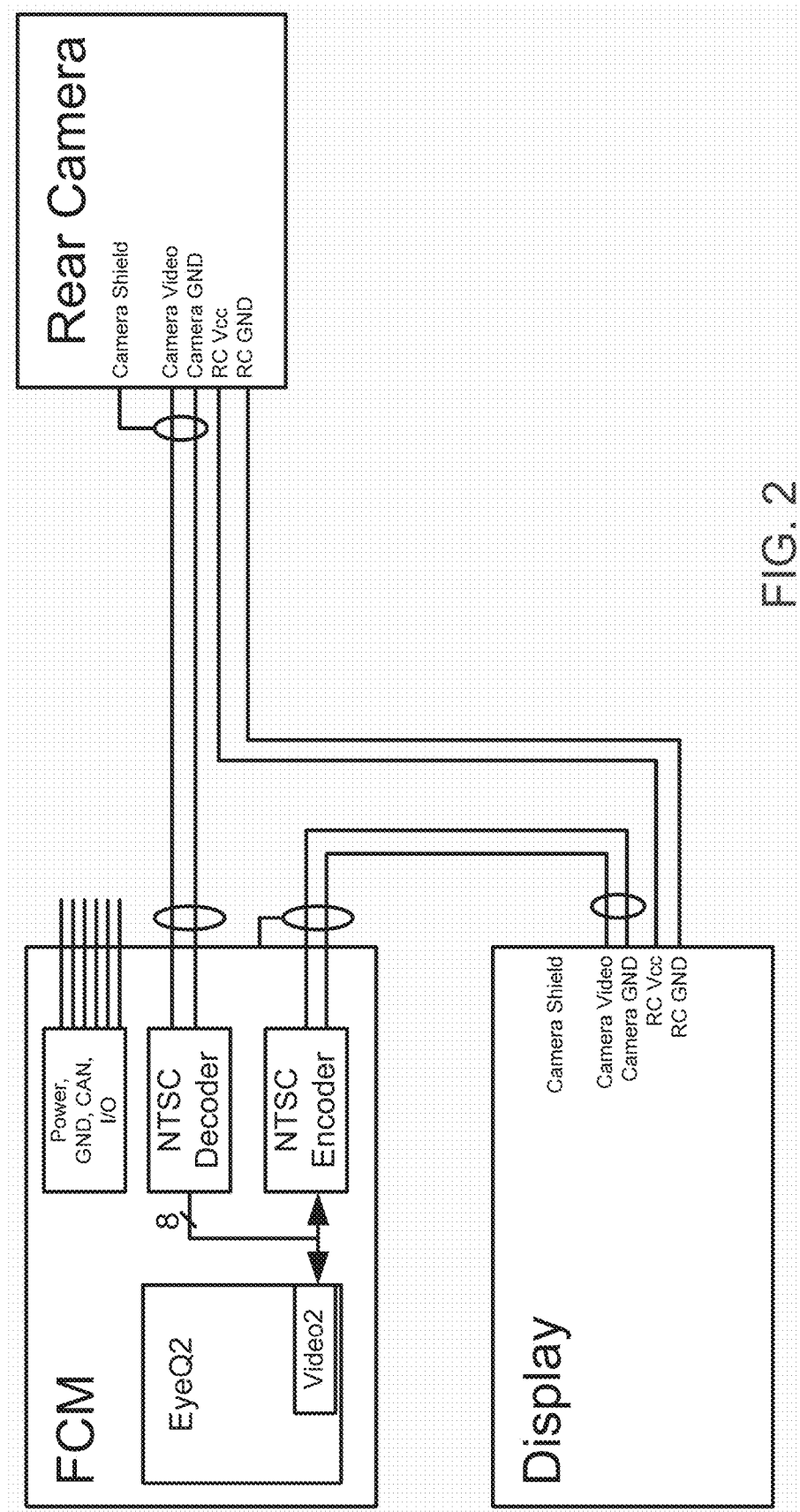
FIG. 2 is a schematic of a vision system of the present invention.

The present invention provides a vehicle vision system that integrates the front and rear cameras. For example, a video line or feed from a rearward facing camera may be fed to a front camera module or FCM (that includes a forward facing imager and associated circuitry). Optionally, and as shown in FIG. 2, a rear camera may have a video and ground line connected to or in communication with a decoder (such as an NTSC decoder) of a front camera module. The front camera module includes the decoder and an encoder (such as an NTSC encoder) and an image processor. For example, the image processor may comprise an EYEQ2 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect objects. The power or Vcc line and the Ground line of the rear camera may connect to a display element or module of the vehicle, and the display is in communication with the encoder of the front camera module, as shown in FIG. 2. Thus, the rear camera video feeds into the front camera module decoder and the decoder feeds decoded video to the image processor or EYEQ2 processor, which may process the image data to detect objects or the like, and the decoder and/or processor may feed an output to the encoder, which feeds the encoded signal to the display for displaying video images derived from image data captured by at least the rearward facing camera (and optionally video images derived from image data captured by the forward facing camera and/or one or more sideward facing cameras of the vehicle, such as for a surround view vision system or the like).

Figure 3:
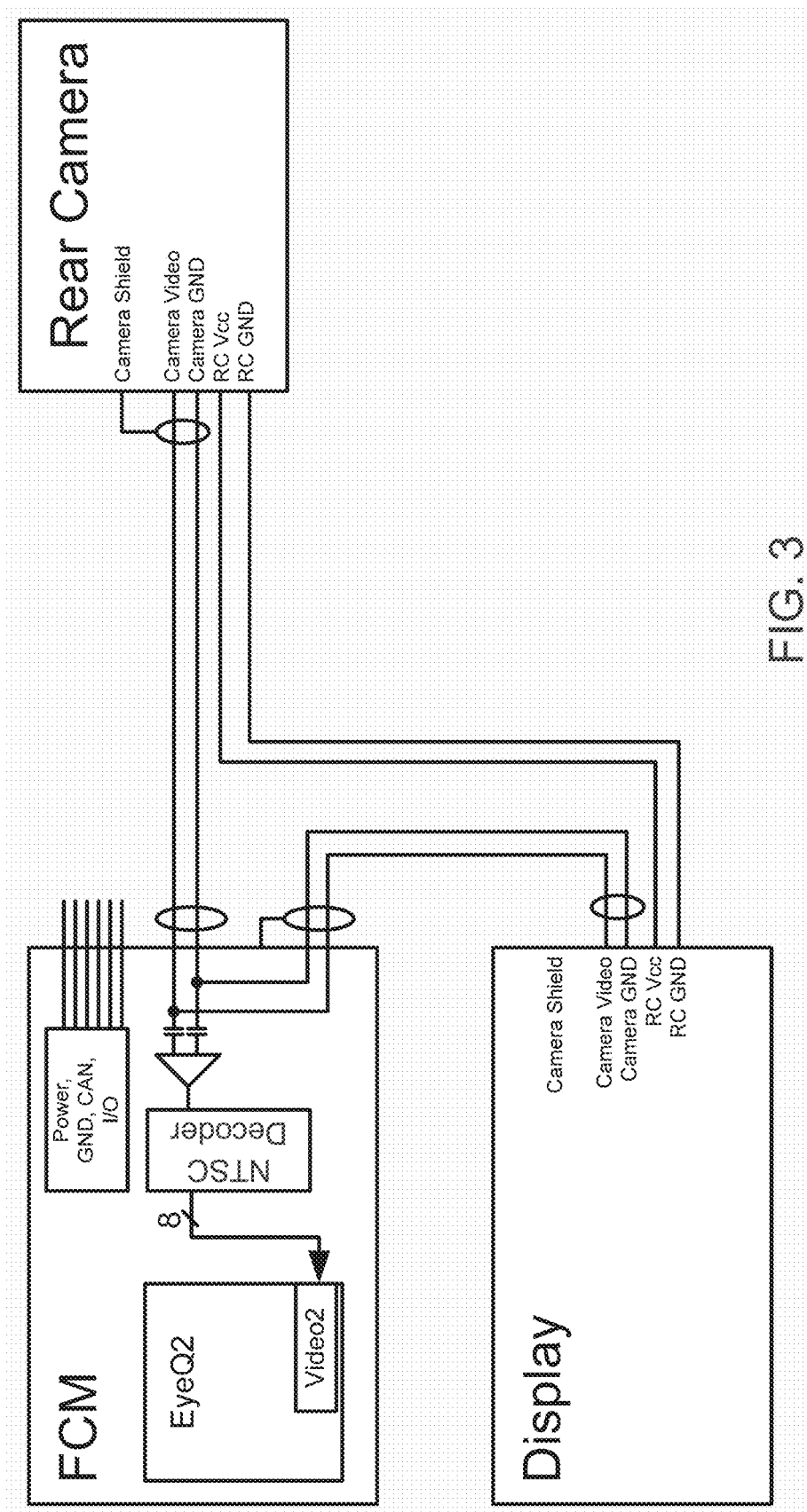
FIG. 3 is a schematic of another vision system of the present invention.

Optionally, and as shown in FIG. 3, a rear camera may be in communication with an amplifier of a front camera module, which feeds video to the FCM decoder, which feeds the video to the image processor. The rear video thus feeds video to the FCM, and an internal splice in the FCM provides a video line to the display, while the amplifier isolates the video from the FCM and feeds video to the decoder, which feeds the video into the image processor. Such a configuration provides the camera integration without a change to the rear camera or to the display, and without need for an encoder (thus reducing the cost of the system).

Figure 4:
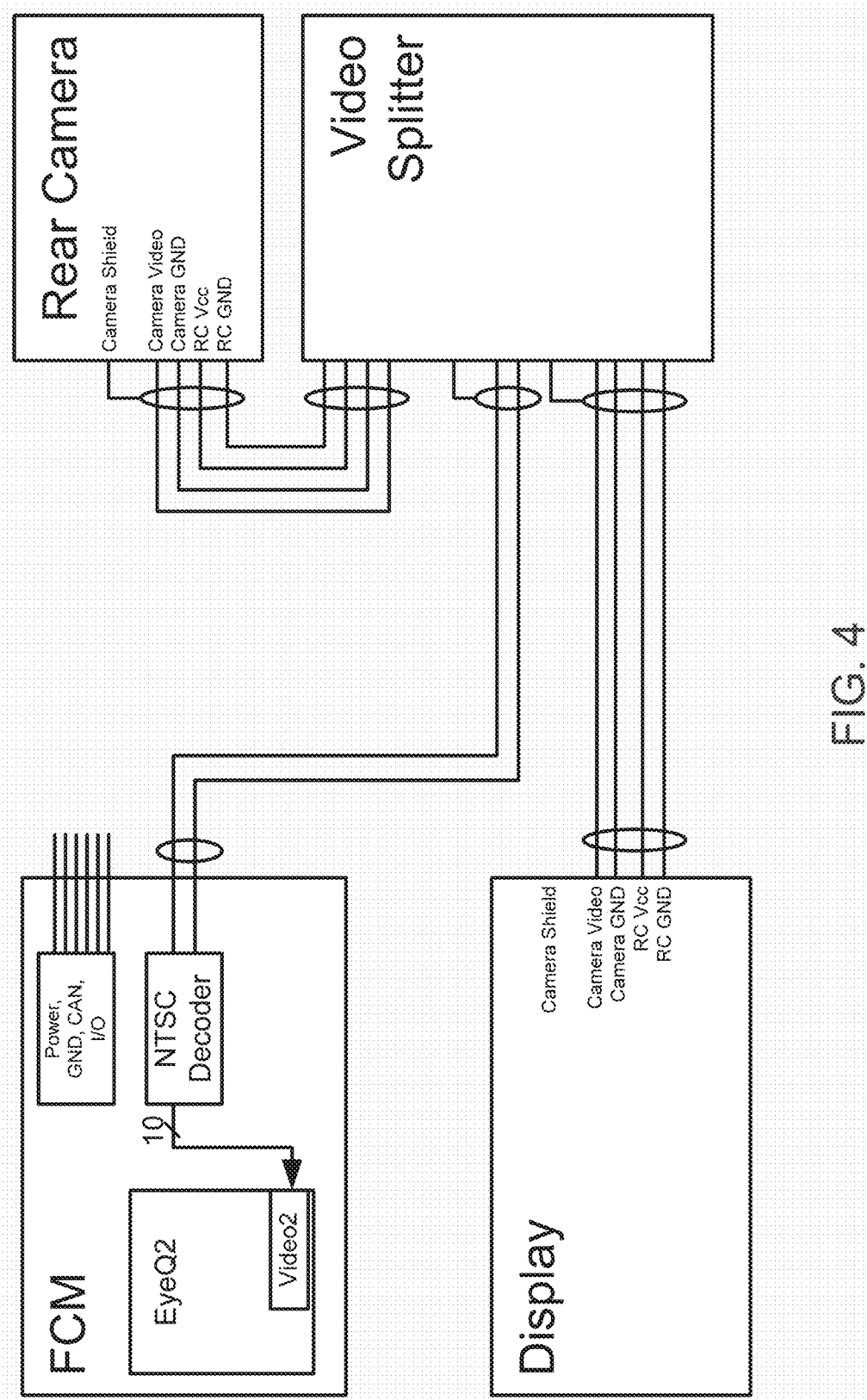
FIG. 4 is a schematic of another vision system of the present invention.
Figure 5:
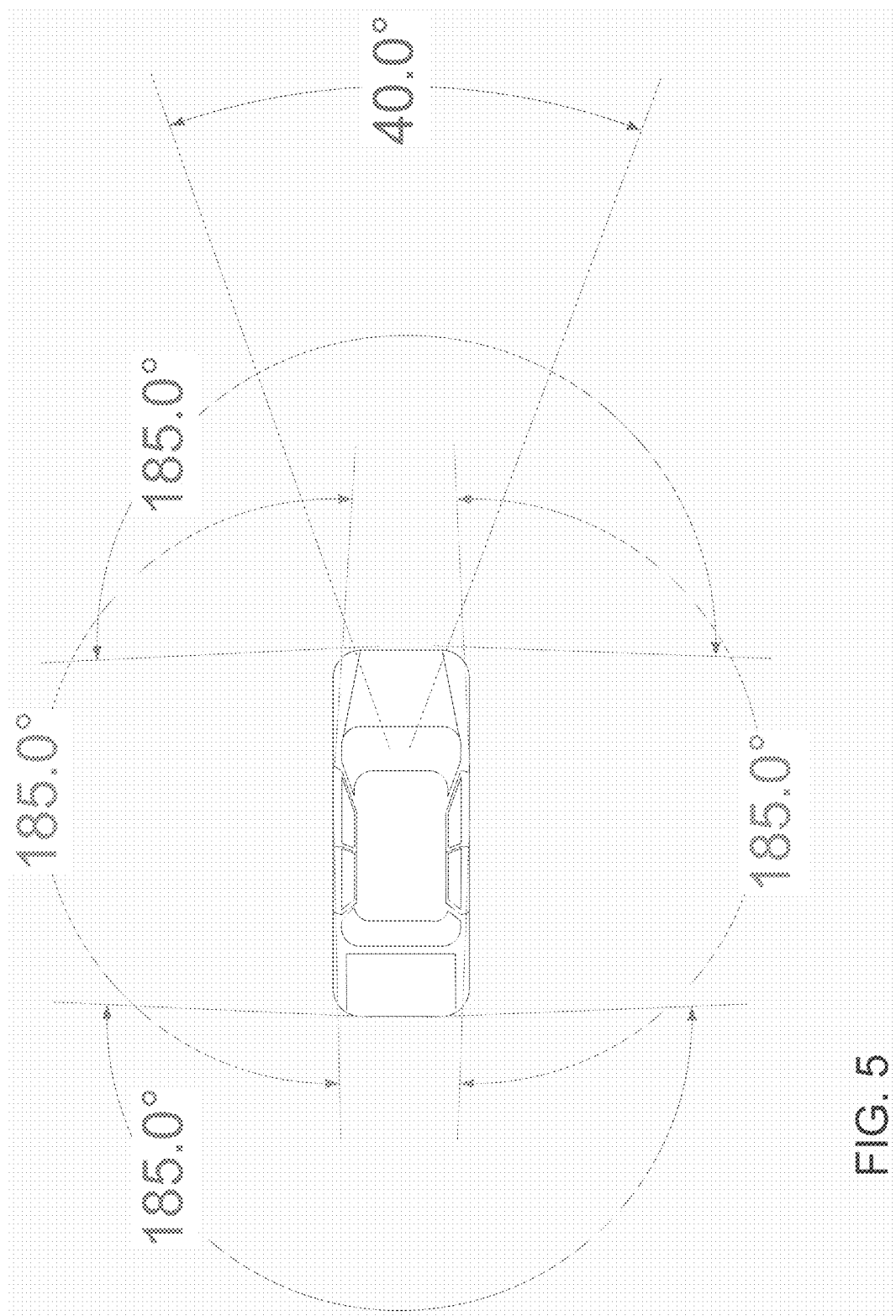
FIG. 5 is a plan view of a vehicle with a vision system and cameras of the present invention.
Figure 6:
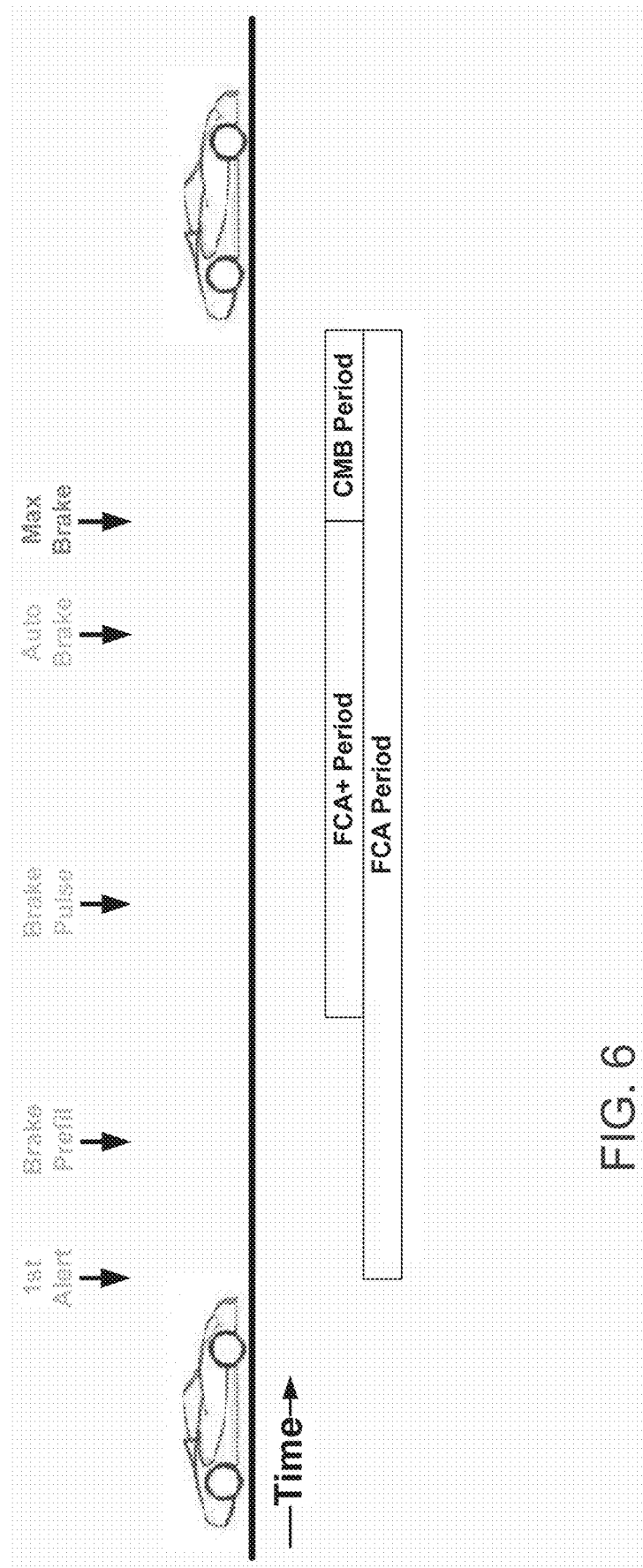
FIG. 6 is a schematic of a vehicle with a vision system and automatic braking control of the present invention.

Optionally, and with reference to FIG. 4, a rear camera video output may be fed to a video splitter, which feeds the video to both the forward camera module and the display. Such a configuration provides the camera integration with no change to the rear camera or to the display, and with fewer pins or terminals at the FCM and less or reduced space requirements in the FCM.

Optionally, a second video output may be added to the rear camera, which may provide a vision system with no change to the display, and with fewer pins or terminals at the FCM and less or reduced space requirements in the FCM. Optionally, a video splitter/pass-through may be added to the display, which may provide a vision system with no change to the rear camera, and with fewer pins or terminals at the FCM and less or reduced space requirements in the FCM.

Figure 7:
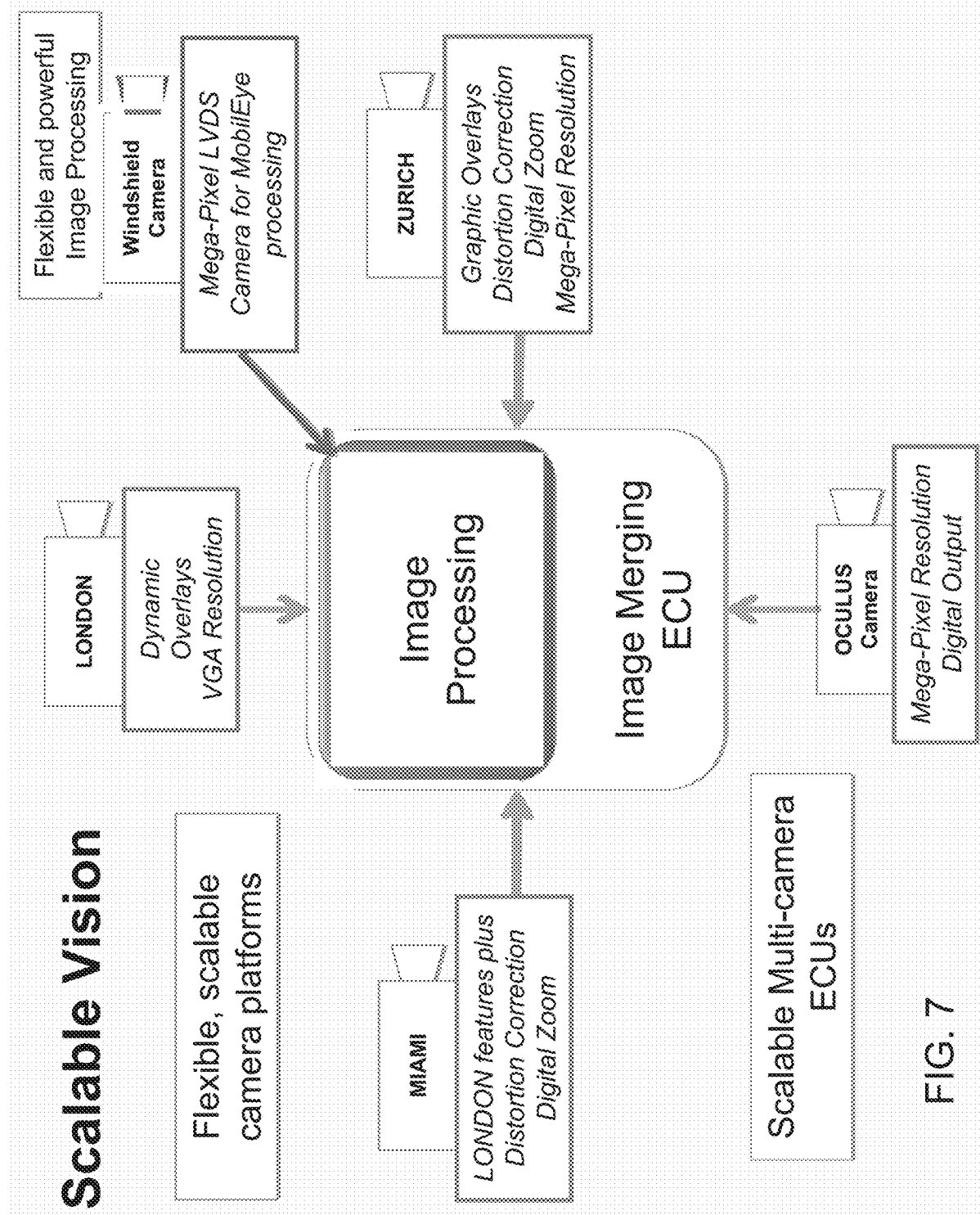
FIG. 7 is a schematic of another vehicle vision system of the present invention.
Figure 8:
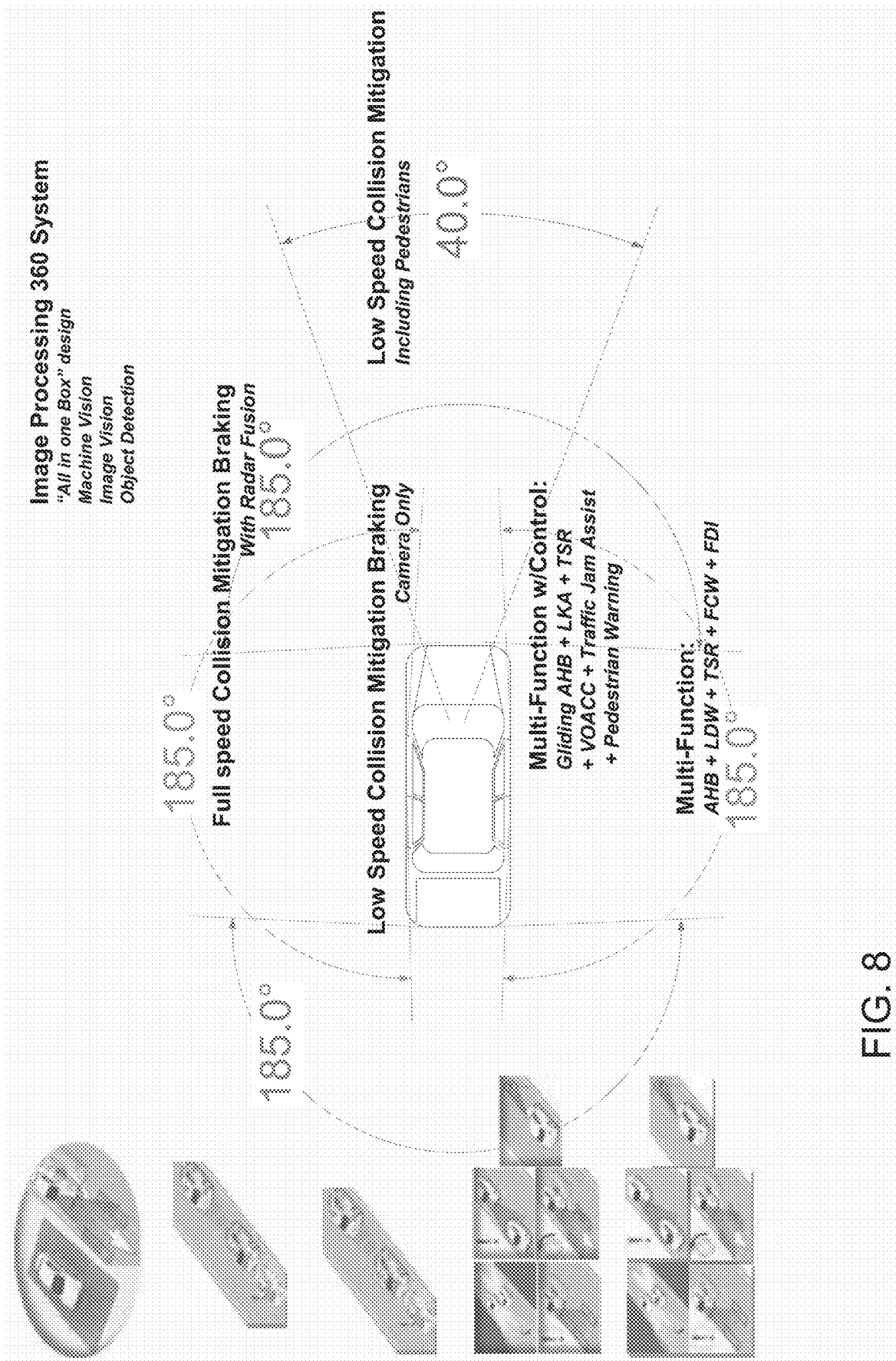
FIG. 8 is a plan view and schematic of a vehicle with a vision system that provides various features in accordance with the present invention.

Optionally, the vision system of the present invention may combine image and machine vision, such as when computing power is available for image processing of the captured images. The combination of image vision cameras (that capture images for displaying images to be viewed by the driver of the vehicle) and machine vision processing (that processes image data to provide various features) allows for additional features. Optionally, and with reference to FIGS. 5-8, the vision system may be associated with an emergency braking system of the vehicle and may provide different braking responses or functions depending on the environment in which the vehicle is driven. For example, different braking control may be provided between city speed driving, urban speed driving and when a pedestrian is detected. As shown in FIG. 8, the vision system may provide various features and different types of braking (responsive to different image processing) depending on the driving environment and whether a vehicle or pedestrian is detected by the vision system.

Optionally, and such as discussed above, the vision system of the present invention may have a rearward facing camera (such as an imaging camera for capturing video images for displaying at a display) video output fed as a video input to a machine vision forward camera (with image processing capabilities). Optionally, the machine vision processor may be part of the front camera or may be located at a central ECU of a surround view system (such as shown in FIG. 7). As shown in FIG. 7, the surround view system includes four cameras having forward, rearward and sideward fields of view, and one windshield mounted camera (having a forward field of view through the windshield of the vehicle), with a central ECU having five camera inputs and one display output.

Figure 9:
FIG. 9 is a perspective view of a bicyclist detected by the vision system of the present invention.

Such a system may provide various features. For example, the system may be operable (utilizing image data captured by the windshield mounted camera and the exterior forward (such as grille mounted) camera) to detect bicyclists traveling along a side region of the road on which the subject vehicle is traveling (such as along a designated bike lane or the like along a side portion of the road surface). The forward camera provides a wider field of view (such as can be seen in FIG. 8) to detect crossing bicycles that are relevant for impact while the vehicle is driven at low speeds. For example, and with reference to FIG. 9, when the vehicle speed is around 10 m/s or thereabouts, the system may be operable to detect the bicycle traveling about 10 m/s at about a 45 degree angle forward and to the side of the vehicle.

Figure 10:
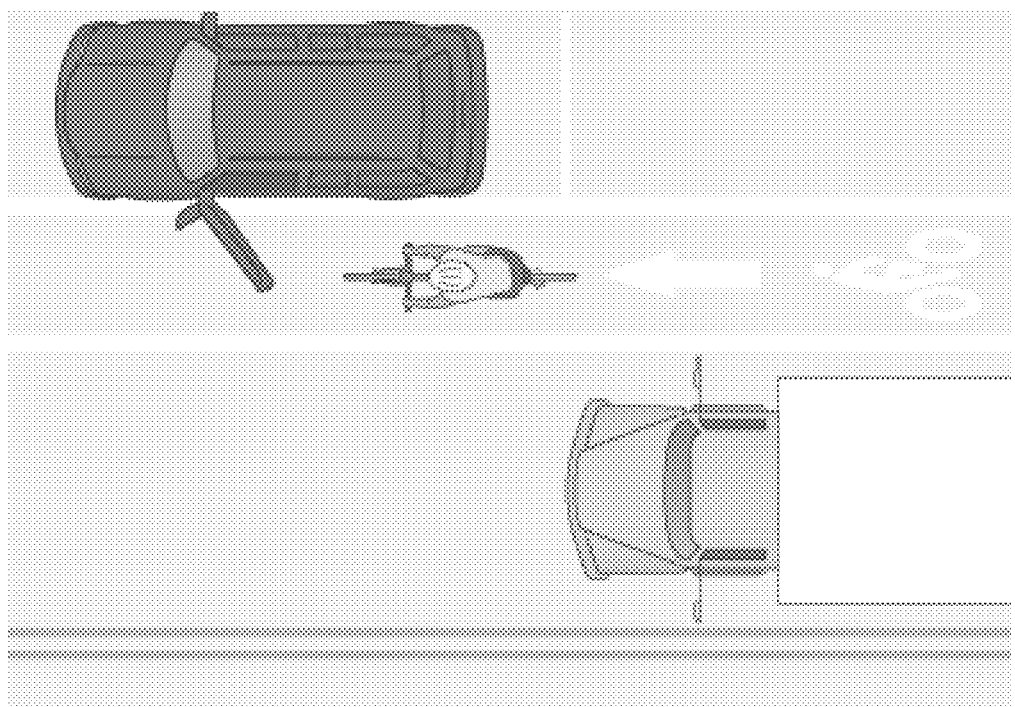
FIG. 10 is a plan view of a vehicle with a vision system that detects objects approaching from the rear to limit the vehicle occupant from opening the vehicle door into the path of the object.

Optionally, the vision system may provide a door opening protection feature or function, such as by detecting (via processing image data captured by the sideview camera at each side of the vehicle) an object or vehicle or bicycle approaching from the rear of the subject vehicle (and when the subject vehicle is parked or not moving), and generating an alert (or locking the vehicle door or precluding opening of the vehicle door) if the system determines that the approaching object may hit the vehicle door if the door were opened. For example, and with reference to FIG. 10, if the vision system detects the approaching bicyclist at and to the rear and side of the parked or non-moving subject vehicle, the system may alert the driver and/or passenger of the vehicle to not open the door at that side of the vehicle or may temporarily lock or limit opening of the vehicle door at that side of the vehicle until the detected object passes the door and is no longer a potential threat of impact.

Optionally, the vision system may provide a child presence detection feature or function. For example, the system may detect the presence of a child (such as via processing of image data captured by the front grille camera, the side view cameras and/or the rear camera) and may generate an alert or warning if a child is determined to be present in proximity of the vehicle, optionally even if the child is not in the path of travel of the vehicle and optionally even if the vehicle is not moving. Optionally, such a system may be specific to detection of children (such as by size of the detected person or the like), and not pedestrians in general.

Optionally, the vision system of the present invention may provide other features, such as, for example, blind spot detection function (to limit or prevent accidents during lane change maneuvers), an onramp assist function (to predict whether car can accelerate enough to merge with existing traffic before the end of the onramp), a low speed CMB/pedestrians function (with a wider field of view to detect pedestrians that are relevant for impact while driving at very low speeds (such as around 1-2 m/s or thereabouts or more or less), a prevent running red lights function (such as by generating an alert and/or optionally braking the vehicle), an alert to go when a traffic light changes to green, an automatic cruise control (ACC) automatic go in a stop and go ACC (such as for city driving conditions/environments), a traffic jam assist function (providing lateral and longitudinal control in traffic jam scenarios (low speed, controlled access road)), an enhanced automatic emergency braking (AEB) function based on rear traffic (optionally, for example, overriding or not braking or delaying braking if rear traffic is present), a better lane detection function in low sun or low lighting conditions (with improved availability of lane information such as, for example, for LKA, LDW and the like), a full autonomous driving function including autonomous lane change to overtake slower cars, construction area driving and lane merges, an autonomous pull-over maneuver function in case of an incapacitated and/or unresponsive driver, an automatic trailer hookup function (which is operable to guide the vehicle to a trailer), a trailer backup function (which is operable to automatically steer the vehicle based on a driver selected trajectory), an automatic parking (parallel, perpendicular) function with drive in control of longitudinal movement, an autonomous/remote controlled parking (parallel, perpendicular) function, a traffic sign recognition (TSR) extension to height limitation signs, a parking path height detection function, an AEB function during a reversing or backup maneuver, a traffic sign recognition (TSR) to set ACC speed (so as to provide a speed limiter function or the like), a ball detection function, a pedestrian impact detection function to activate active a pedpro system (such as to use a camera to replace an existing sensor or in addition to another impact sensor), a road friction estimation function (such as for determining if the vehicle is traveling on snow, gravel, ice or the like) to adjust the AEB thresholds and/or curve speed warning, a pothole depth and speed bump height estimation function for an active suspension control, a read license plate of preceding/following vehicle function (such as, for example, for Amber Alert notifications and the like), a curb detection/warning if a curb is too high to drive onto (such as if the vehicle is being driven towards a curb, so as to limit or prevent damage to the wheels or rims of the vehicle), an application of 3D information to parking situations function, a perspective correction function for a more accurate birds eye view (more realistic image), an ACC function that limits or precludes acceleration of the subject vehicle when the subject vehicle is being overtaken by another vehicle, and/or a lighting control function (such as providing an adjust lighting decision based on knowledge or other car overtaking of driving parallel to the subject vehicle, and/or the like.

Optionally, the vision system of the present invention may be operable to provide various functions. For example, the vision system may operate with or be associated with an adaptive automatic emergency braking (AEB) system of the vehicle, such that, when the subject vehicle determines that braking is desired or appropriate, the subject vehicle may, for example, brake earlier and/or harder, if no vehicle is following (as determined by image processing of the image data captured by the rearward facing camera), and risk of rear end collision is low, or may brake later, if the vision system determines that a vehicle is following, and the risk of rear end collision is higher. Optionally, the vision system may provide improved or enhanced lane detection at low sun/and increased availability of LDW based on detecting lanes in the rear camera images. Optionally, the vision system may provide rear pedestrian detection, and may provide a warning or may brake if a pedestrian is detected in the rear images, such as during a reversing maneuver of the vehicle. Optionally, the vision system may provide a rear object detection, and may provide a warning or the like if a general object is detected in the rear images. Optionally, the vision system may provide a rear cross traffic alert function, and may detect or determine crossing vehicles and may be operable to alert or warn the driver of the subject vehicle of crossing vehicles when the driver is reversing or backing up the subject vehicle.

Figure 11:
FIG. 11 is an image showing a rear pedestrian detection function of the vision system of the present invention.

For example, the vision system may provide pedestrian detection when backing up by determining when a pedestrian is present in the rearward field of view of the camera. The system may detect standing/walking adults and children at relevant ranges, with reasonable false alarm rate (such as, for example, 1 false detection per 50 or more backup maneuvers). The system may utilize pedestrian detection and classification aspects from a front object detection system applied to rear image processing (FIG. 11). The system may use additional crossing cues for moving pedestrians. The system may determine that a detected object is a pedestrian and generate an output based on various aspects of the object, such as a lateral distance to the object, a longitudinal distance to the object, the object height, the object width, an X-position in the captured image and/or a Y-position in the captured image and/or the like. The vision system thus may reduce the risk of back-over accidents, and, if driver is not looking at the rear camera display (such as indicated by the driver not braking the vehicle when the display shows an object or pedestrian rearward of the vehicle during a reversing maneuver), the system may generate an alert to warn the driver of a rear pedestrian detection and/or generate automatic braking to slow or stop the vehicle.

Figure 12:
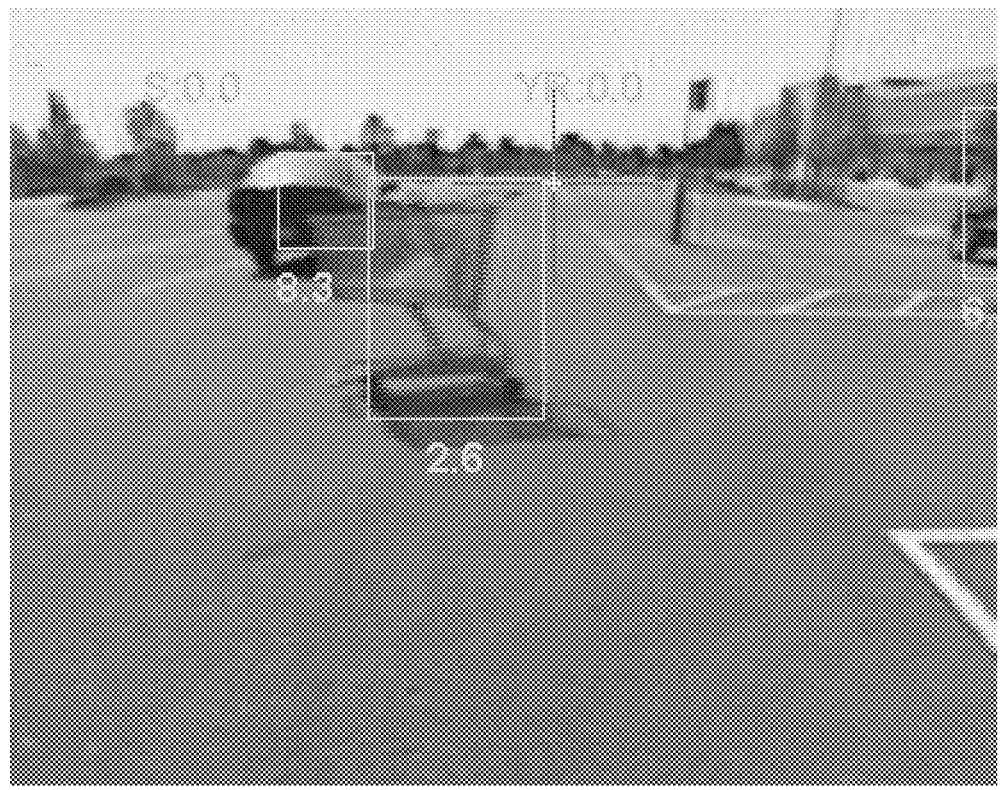
FIG. 12 is an image showing a rear object detection function of the vision system of the present invention.

Similarly, the vision system may provide a rear object detection function to detect larger objects rearward of the vehicle (FIG. 12). The vision system may utilize SFM (structure from motion) and use image sequences to compute a dense three dimensional map of the road and stationary objects above the road, and the system may use lateral motion detection for general moving objects. The vision system thus may reduce the risk of back-over accidents, and, if driver is not looking at the rear camera display, the system may generate an alert to warn the driver of a rear pedestrian detection and/or generate automatic braking to slow or stop the vehicle.

Figure 13:
FIG. 13 is an image showing a side cross traffic detection function of the vision system of the present invention.

Optionally, the vision system may provide a rear cross traffic alert function and may detect crossing vehicles in or approaching the rearward path of the subject vehicle during a reversing maneuver of the subject vehicle (FIG. 13). The system may utilize vehicle detection (pattern based) and lateral motion detection to identify cross traffic and warn the driver of the subject vehicle based on such detection and identification. The algorithm performance of the system may depend on the quality of the images and vehicles in image. For example, the system may detect sideward approaching vehicles from up to about 30 m to either side of the subject vehicle. Optionally, and desirably, the system may optimize rear camera distortion correction to work with the vehicle detection algorithm to enhance such detection and identification of approaching vehicles. The vision system thus limits or substantially reduces collisions with crossing traffic rearward of the subject vehicle during a reversing maneuver of the subject vehicle, and the system may generate an alert to warn the driver of the subject vehicle of an approaching vehicle (and may identify or inform the driver as to which side of the subject vehicle the detected vehicle is approaching from).

Figure 14:
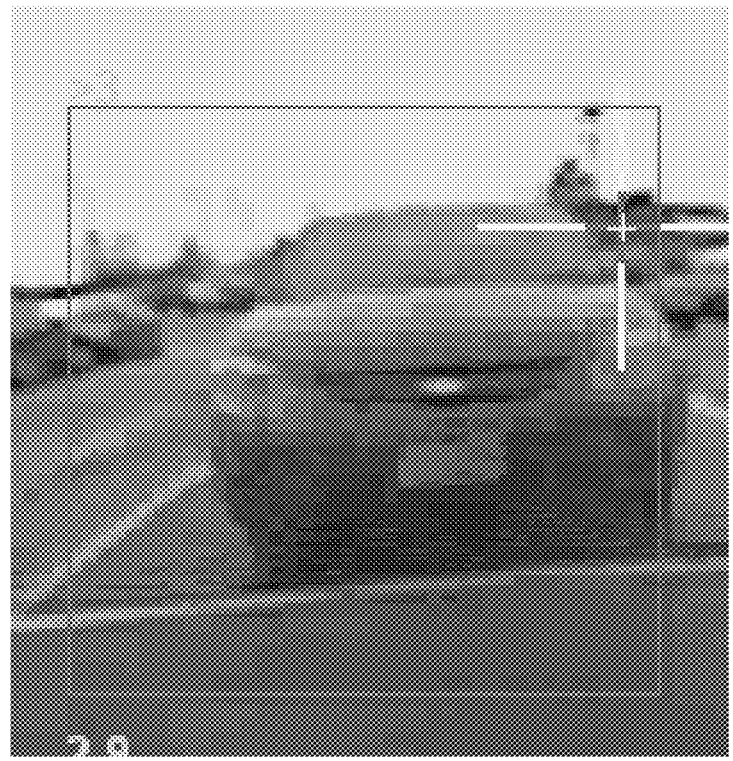
FIGS. 14 and 15 show aspects of an adaptive emergency braking system of the vision system of the present invention.
Figure 15:
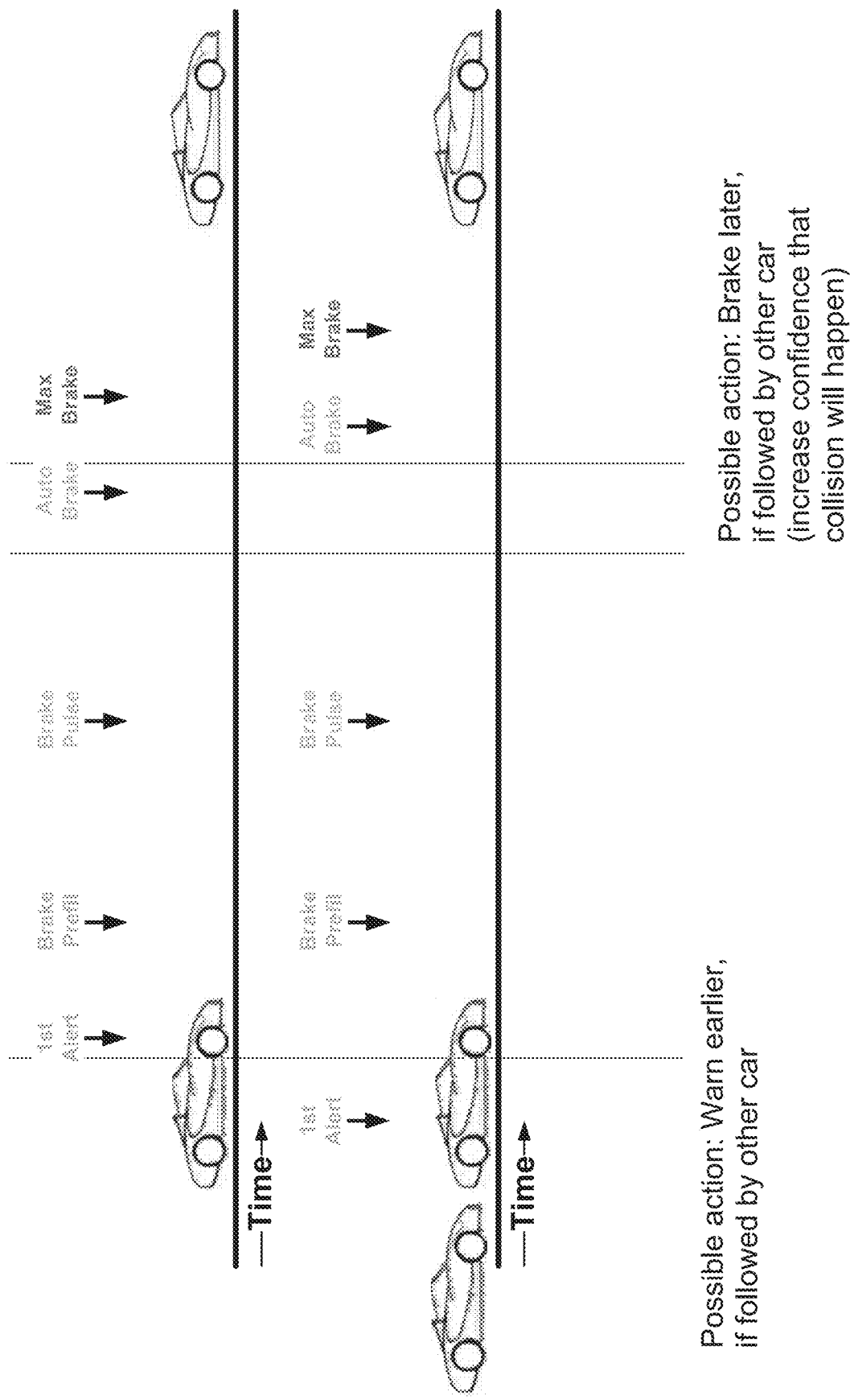

Optionally, the vision system may provide an adaptive automatic emergency braking (AEB) function (FIGS. 14 and 15). For example, the AEB may be based on the presence of a following vehicle (a vehicle following the subject vehicle) when the subject vehicle vision system has detected a vehicle or object ahead of the subject vehicle that presents a condition or situation that may require braking of the subject vehicle to avoid a collision with the detected object or vehicle. The AEB system is operable to brake earlier and/or harder if no vehicle is detected behind or following the subject vehicle, and the risk of a rear end collision is thus low, and/or the AEB system is operable to brake later if a vehicle is detected behind or following the subject vehicle, and risk of a rear end collision is thus higher. The system may utilize pattern based vehicle detection to detect vehicles (such as vehicles up to about 50 to 60 meters (or more) ahead and/or behind the subject vehicle) and may determine if a detected following vehicle object is in the same lane or adjacent lane as the subject vehicle and may determine the distance that the detected following vehicle is behind the subject vehicle, and may adapt the braking application accordingly. The vision system may provide an earlier warning to the driver of the subject vehicle and may provide a reduced risk of false brake activation.

Figure 16:
FIG. 16 is an image showing a rear lane marker detection function of the vision system of the present invention.

Optionally, the vision system may utilize rear image processing for lane detection (FIG. 16). For example, the system may apply lane detection and tracking aspects from front image processing to rear images captured by one or more rearward facing cameras of the vehicle. The system may detect the lane markings and may determine the lateral distance to a left or right lane marking, and may control steering and/or provide an alert to the driver responsive to the detected distance to the lane markings. The system thus provides increased availability of lane information to the driver, and may warn the driver even where lane departure prevention (LDP) from the front camera may not be available, such as in low lighting conditions or situations, traffic jams (when preceding vehicles block lane markings), tunnel entry and/or the like. Optionally, it is envisioned that the rear lane detection of the present invention may be used for autonomous driving/lane keeping where high lane data availability is important.

Figure 17:
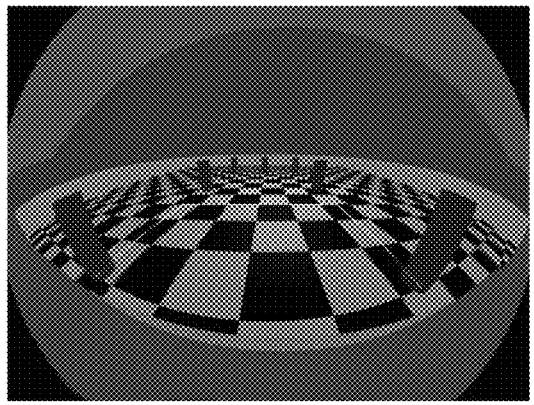
FIGS. 17 and 18 are images showing different views based on images captured by a rear camera of the vision system of the present invention.
Figure 17:
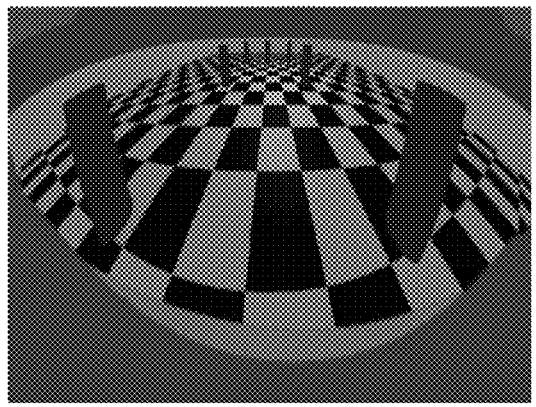
Figure 17:
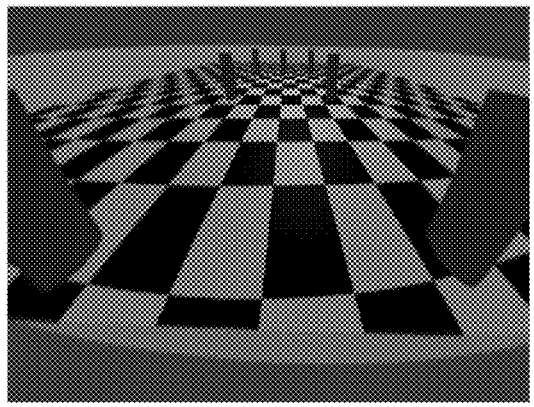
Figure 17:
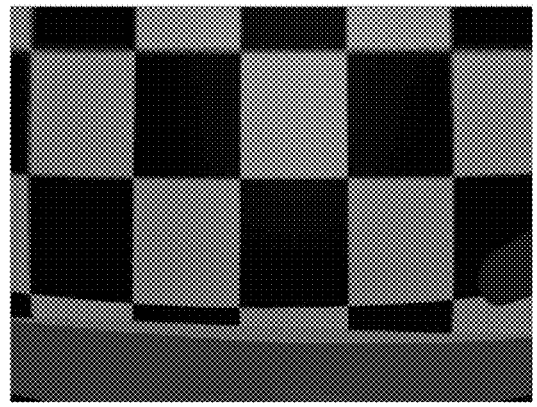
Figure 18:
Figure 18:
Figure 18:
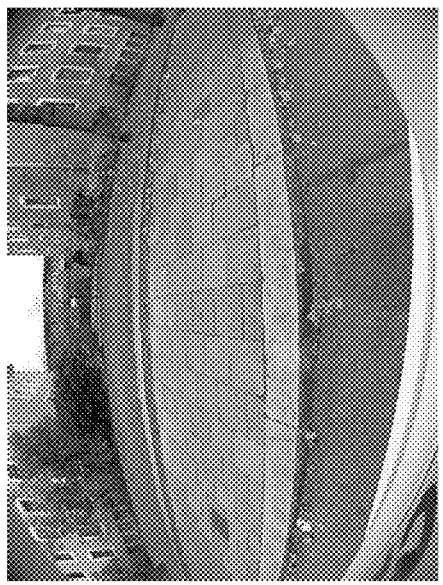
Figure 18:
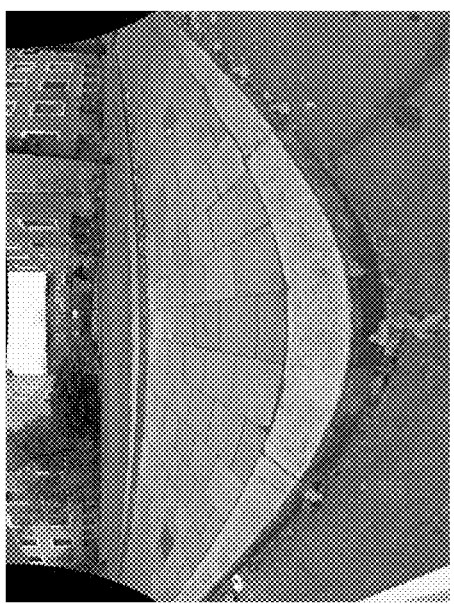
Figure 18:

The vision system of the present invention may capture rearward images and may display different aspects or portions of the captured images for different information display functions (such as during a reversing maneuver and the like, where a wide angle rearward image is desired). For example, and with reference to FIGS. 17 and 18, the system may provide an uncorrected raw view, a corrected wide view, a normal view and a top view for different functions or applications. Preferably, the vision system will apply the image processing (for object detection and the like) to one of the views, such as the corrected wide view, which is presentable to the driver at the display screen, and provides a wide angle field of view for rear cross traffic detection. While the normal view and the top view are also presentable to the driver, the normal view is not typically wide enough for rear cross traffic detection and the top view is a special view with limited range.

Figure 19:
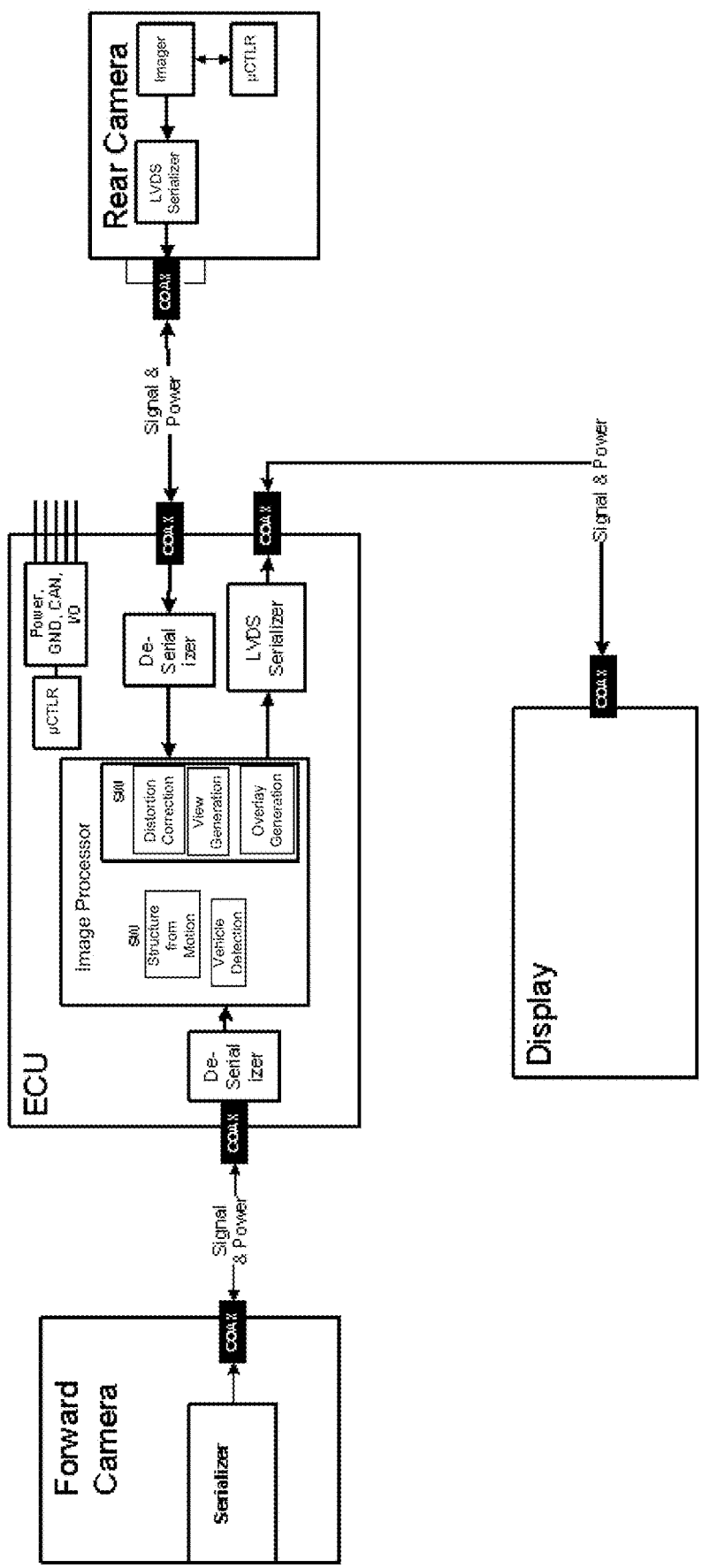
FIG. 19 is a schematic of another vehicle vision system of the present invention.

Optionally, and with reference to FIG. 19, the vision system may be operable to process image data captured from a front camera and image data captured from a rear camera using a common image processor (such as by utilizing aspects of the systems described in U.S. Pat. No. 7,855,755, which is hereby incorporated herein by reference in its entirety). The system may utilize NTSC rear video or may utilize a rear megapixel camera or the like. By relying on the rear camera to create three different view modes (wide, normal, top-view), the cross traffic alert will only work when the rear camera is in wide view mode. Because the view mode is typically selected by the driver using hardwired connections, the system does not control the view mode. The system relies on the display to create overlays, so the system preferably can manage latency problems between detection and overlay presentation. An advantage to this type of system is that it may provide the desired features at a relatively lower cost or reduced cost.

Optionally, and with reference to FIG. 19, the vision system may comprise a forward facing camera and a rearward facing camera and a separate common image processor. In the illustrated embodiment, the rear camera images are transmitted via LVDS (preferably over coaxial cables) to the image processor (such as an EYEQ2 or EYEQ3 image processor available from Mobileye Vision Technologies Ltd. of Jerusalem, Israel), and the communication cables may utilize aspects of the systems described in International Publication No. WO 2013/043661, which is hereby incorporated by reference in its entirety. The image processor is operable to interpret the image, and also creates the different views desired by vehicle manufacturer, including cropping, distortion correction, and overlay generation. The visual image manipulation is implemented by algorithms or code running on the image processor, and the image is then sent to the display in a "ready to view" format.

Because the vision system of FIG. 19 adds two video connectors to the front camera, it may not be ideal for typical forward facing camera or imager package at the windshield. Instead, the vision system of FIG. 19 separates the front camera and the image processor and thus provides a two-box solution, with the image processing board being removed from the camera and disposed at or in a second box or module or unit that can be packaged anywhere in the vehicle. The vision system thus may meet the cross traffic requirements, including the hardwired interfaces for which there typically is not enough connector space at the windshield, and the system may achieve better overall system performance, since there is more information provided from the rear imager (both by virtue of being higher resolution and by providing pixel accurate data), and the system may be able to run cross traffic alerts with all of the desired views.

The vision system thus may feed video from a rear imager or rearward facing camera and may feed video from a front imager or forward facing camera into a separate and common image processing unit or module where there is separation between image manipulation software for processing images for display and image data processing for processing image data for object detection and/or the like. The image processor is thus decoupled from both imagers and could be disposed anywhere in the vehicle (and optionally could be disposed at or near or in the forward facing camera module). The image processor has both front and rear camera feeds and can process image data from both cameras simultaneously. The system thus utilizes software building blocks that can be applied to the front and rear images. The common image processor may be operable to utilize SFM on the front and rear images, and the image data or processed output may be passed to other algorithms for image manipulation for presenting the information for viewing by the driver at the display screen. The system may utilize coaxial cable that carries the camera or image signal and power bi-directionally. Such cables reduce the cost of the transmission/communication and makes the option of having a separate common image processor more attractive to the vehicle manufacturer (due to the lower cost cables and connectors such that the additional connectors and cables do not significantly add to the cost of the system).

In applications where the system operates as an automatic emergency braking system, it is important that a certain degree of safeness of absence of unjustified braking events is provided. Customers (driven by ISO26262) require certain theoretical analysis to guarantee a vehicle is "safe" (in the case of an emergency braking system, such safety is defined as "lack of unjustified brake events"). It is difficult to theoretically prove that the system (such as the image processor, such as a Mobileye EYEQ type image processor or the like) doesn't cause unjustified brake events. However, ISO26262 also accepts a "proven in use" argument that may be used for camera-based emergency braking. The method to develop an emergency braking system that utilizes such a "proven in use" feature comprises the following steps:

1. Develop a signal to initiate emergency braking. For example, this signal could be generated when the determined "time to contact" (TTC) is less than about 0.7 sec and the vehicle speed is less than 80 km/h.

2. During a first time period, the system may monitor all vehicles in which the signal occurs. This can be done using a Trip Statistics and Alert Data Download (TSADD) feature. As part of this feature, vehicle data (including, for example, vehicle speed, brake activation, and/or compressed camera images or the like) may be collected that allows an evaluation as to whether or not the signal was justified. The vehicle data may be collected via any suitable means, such as through a telematics system of the vehicle (such as, for example, ONSTAR®) or the like.

3. The system evaluates the signals that occurred in a large set of vehicles and over a prolonged period of time. In other words, the system uses more than just a handful of test vehicles, and instead may monitor, for example, about 100,000 (or more or less) customer vehicles over the course of several months to a year (or more or less) to collect a statistically significant set of signals.

4. If, in step 3, it can be concluded that the signal is clear of unjustified brake events, the system may use the signal which has now been proven in use to automatically activate brakes when the appropriate condition is detected.

Thus, the present invention is operable to provide an enhanced determination of the safeness of the AEB system by determining and using signals and parameters that have been tested in real life situations and determined to have resulted in few or no unjustified braking events. The present invention uses "proven in use" signals and parameters to derive an appropriate signal for that vehicle and/or vehicle type and/or driving conditions and/or the like.

The cameras or sensors may comprise any suitable cameras or sensors. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012, and published on Jun. 6, 2013 as International Publication No. WO 2013/081984, and/or PCT Application No. PCT/US2012/066571, filed Nov. 27, 2012, and published Jun. 6, 2013 as International Publication No. WO 2013081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258;

7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 20102/145822; WO 2013/043661; WO 2013/048994, and/or PCT Application No. PCT/US2012/061548, filed Oct. 24, 2012, and published on May 2, 2013 as International Publication No. WO 2013/063014, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published Jul. 11, 2013 as International Publication No. WO 2013/103548, and/or PCT Application No. PCT/US2013/022119, filed Jan. 18, 2013, and published Jul. 25, 2013 as International Publication No. WO 2013/109869, and/or PCT Application No. PCT/US2013/026101, filed Feb. 14, 2013, and published Aug. 22, 2013 as International Publication No. WO 2013/123161, and/or PCT Application No. PCT/US2013/027342, filed Feb. 22, 2013, and published Aug. 9, 2013 as International Publication No. WO 2013/126715, and/or PCT Application No. PCT/US2013/036701, filed Apr. 16, 2013, and published Oct. 24, 2013 as International Publication No. WO 2013/158592 and/or U.S. patent application Ser. No. 13/851,378, filed Mar. 27, 2013, now U.S. Pat. No. 9,319,637; Ser. No. 13/848,796, filed Mar. 22, 2013, and published on Oct. 24, 2013 as U.S. Patent Publication No. US-2013-0278769; Ser. No. 13/847,815, filed Mar. 20, 2013, and published on Oct. 31, 2013 as U.S. Patent Publication No. US-2013-0286193; Ser. No. 13/800,697, filed Mar. 13, 2013, and published on Oct. 3, 2013 as U.S. Patent Publication No. US-2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/804,786, filed Mar. 25, 2013; Ser. No. 61/793,592, filed Mar. 15, 2013; Ser. No. 61/793,614, filed Mar. 15, 2013; Ser. No. 61/793,558, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/758,537, filed Jan. 30, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/713,772, filed Oct. 15, 2012; Ser. No. 61/710,924, filed Oct. 8, 2012; Ser. No. 61/710,247, filed Oct. 2, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012, which are all hereby incorporated herein by reference in their entireties. The system may communicate with other communication systems via any suitable means, such as by utilizing aspects of the systems described in International Publication Nos. WO 2013/043661 and/or WO 2010/144900, and/or PCT Application No. PCT/US2012/066571, filed Nov. 27, 2012, and published Jun. 6, 2013 as International Publication No. WO 2013081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416 and/or WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501 and/or WO 2012/0145313, and/or PCT Application No. PCT/CA2012/000378, filed Apr. 25, 2012, and published Nov. 1, 2012 as International Publication No. WO 2012/145822, and/or PCT Application No. PCT/US2012/066571, filed Nov. 27, 2012, and published Jun. 6, 2013 as International Publication No. WO 2013081985, and/or PCT Application No. PCT/US2012/068331, filed Dec. 7, 2012, and published Jun. 13, 2013 as International Publication No. WO 2013/086249, and/or PCT Application No. PCT/US2013/022119, filed Jan. 18, 2013, and published Jul. 25, 2013 as International Publication No. WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091, 525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular control system, said vehicular control system comprising:
 a forward-viewing camera disposed at a portion of an in-cabin side of a windshield of a vehicle equipped with said vehicular control system;
 said forward-viewing camera comprising an imaging sensor;
 wherein, with said forward-viewing camera attached at the vehicle windshield, the imaging sensor of said forward-viewing camera views forward through the vehicle windshield;
 wherein the imaging sensor of said forward-viewing camera comprises an array of a plurality of photosensor elements arranged in multiple columns and multiple rows;
 wherein the imaging sensor of said forward-viewing camera has a forward field of view exterior of the equipped vehicle and is operable to capture image data;
 wherein said forward-viewing camera comprises a first low-voltage differential signaling (LVDS) serializer;
 a rearward-viewing camera disposed at a rear portion of the equipped vehicle;
 said rearward-viewing camera comprising an imaging sensor;
 wherein the imaging sensor of said rearward-viewing camera comprises an array of a plurality of photosensor elements arranged in multiple columns and multiple rows;
 wherein the imaging sensor of said rearward-viewing camera has a rearward field of view exterior of the equipped vehicle and is operable to capture image data;
 wherein said rearward-viewing camera comprises a second LVDS serializer;
 wherein a driver side-viewing camera is disposed at a driver-side portion of the equipped vehicle;
 wherein said driver side-viewing camera comprises an imaging sensor;
 wherein the imaging sensor of said driver side-viewing camera comprises an array of a plurality of photosensor elements arranged in multiple columns and multiple rows;
 wherein the imaging sensor of said driver side-viewing camera has a sideward field of view exterior of the equipped vehicle and is operable to capture image data;
 wherein said driver side-viewing camera comprises a third LVDS serializer;
 wherein a passenger side-viewing camera is disposed at a passenger-side portion of the equipped vehicle;
 wherein said passenger side-viewing camera comprises an imaging sensor;
 wherein the imaging sensor of said passenger side-viewing camera comprises an array of a plurality of photosensor elements arranged in multiple columns and multiple rows;
 wherein the imaging sensor of said passenger side-viewing camera has a sideward field of view exterior of the equipped vehicle and is operable to capture image data;
 wherein said passenger side-viewing camera comprises a fourth LVDS serializer;
 an electronic control unit (ECU);
 wherein said ECU comprises (i) a first LVDS de-serializer, (ii) a second LVDS de-serializer, (iii) a third LVDS de-serializer, (iv) a fourth LVDS de-serializer, (v) an electrical power source and (vi) a data processor;
 wherein said forward-viewing camera connects with said ECU via a first coaxial cable;
 wherein said rearward-viewing camera connects with said ECU via a second coaxial cable;
 wherein said driver side-viewing camera connects with said ECU via a third coaxial cable;
 wherein said passenger side-viewing camera connects with said ECU via a fourth coaxial cable;
 wherein signal communication between said forward-viewing camera and said ECU via said first coaxial cable is bidirectional;
 wherein signal communication between said rearward-viewing camera and said ECU via said second coaxial cable is bidirectional;
 wherein signal communication between said driver side-viewing camera and said ECU via said third coaxial cable is bidirectional;
 wherein signal communication between said passenger side-viewing camera and said ECU via said fourth coaxial cable is bidirectional;

wherein image data captured by the imaging sensor of said forward-viewing camera is converted at said first LVDS serializer to a first image signal that is carried to said ECU via said first coaxial cable;

wherein image data captured by the imaging sensor of said rearward-viewing camera is converted at said second LVDS serializer to a second image signal that is carried to said ECU via said second coaxial cable;

wherein image data captured by the imaging sensor of said driver side-viewing camera is converted at said third LVDS serializer to a third image signal that is carried to said ECU via said third coaxial cable;

wherein image data captured by the imaging sensor of said passenger side-viewing camera is converted at said fourth LVDS serializer to a fourth image signal that is carried to said ECU via said fourth coaxial cable;

wherein the first image signal is de-serialized at said first LVDS de-serializer of said ECU;

wherein the second image signal is de-serialized at said second LVDS de-serializer of said ECU;

wherein the third image signal is de-serialized at said third LVDS de-serializer of said ECU;

wherein the fourth image signal is de-serialized at said fourth LVDS de-serializer of said ECU;

wherein, responsive at least in part to processing at said ECU of the de-serialized first image signal, a vehicle present in the forward field of view of said forward-viewing camera is detected; and wherein, responsive at least in part a determination by said vehicular control system that the equipped vehicle and the detected vehicle may collide, said vehicular control system, at least in part, controls a braking system of the equipped vehicle.

2. The vehicular control system of claim 1, wherein a surround vision system of the equipped vehicle at least comprises said forward-viewing camera, said driver side-viewing camera and said passenger side-viewing camera.

3. The vehicular control system of claim 1, wherein said vehicular control system detects a bicyclist traveling along a road on which the equipped vehicle is traveling.

4. The vehicular control system of claim 1, wherein, at least in part responsive to processing at said ECU of at least one selected from the group consisting of (i) the de-serialized second image signal, (ii) the de-serialized third image signal and (iii) the de-serialized fourth image signal, said vehicular control system detects an object approaching the equipped vehicle from rearward of the equipped vehicle.

5. The vehicular control system of claim 4, wherein, responsive at least in part to a determination by said vehicular control system that the rearward approaching object may impact a door of the equipped vehicle if it is opened, said vehicular control system limits opening of the vehicle door.

6. The vehicular control system of claim 5, wherein the rearward approaching object comprises a bicyclist.

7. The vehicular control system of claim 1, wherein, at least in part responsive to processing at said ECU of the de-serialized second image signal, said vehicular control system determines presence of an object in the rearward field of view of said rearward-viewing camera.

8. The vehicular control system of claim 7, wherein, at least in part responsive to processing at said ECU of the de-serialized second image signal, said vehicular control system distinguishes a child from an adult.

9. The vehicular control system of claim 1, wherein said vehicular control system processes sequential frames of captured image data to generate a three dimensional map along a road on which the equipped vehicle is traveling.

10. The vehicular control system of claim 1, wherein said data processor comprises an image processing chip.

11. The vehicular control system of claim 1, wherein the braking system of the equipped vehicle provides different braking functions depending on the environment in which the equipped vehicle is driven.

12. The vehicular control system of claim 1, wherein, responsive at least in part to processing at said ECU of the de-serialized first image signal, said vehicular control system, at least in part, controls an automatic emergency braking system of the equipped vehicle.

13. The vehicular control system of claim 1, wherein a front camera is disposed at a front portion of the equipped vehicle, and wherein said front camera comprises an imaging sensor comprising an array of a plurality of photosensor elements arranged in multiple columns and multiple rows, the imaging sensor of said front camera having a forward field of view exterior of the equipped vehicle and operable to capture image data, and wherein said front camera comprises a fifth LVDS serializer, and wherein said ECU comprises a fifth LVDS de-serializer, and wherein said front camera connects with said ECU via a fifth coaxial cable, and wherein image data captured by the imaging sensor of said front camera is converted at said fifth LVDS serializer to a fifth image signal that is carried to said ECU via said fifth coaxial cable, and wherein the fifth image signal is de-serialized at said fifth LVDS de-serializer of said ECU.

14. The vehicular control system of claim 13, said vehicular control system at least in part controls a cross traffic alert function that utilizes processing at said ECU of at least one selected from the group consisting of (i) the de-serialized second image signal and (ii) the de-serialized fifth image signal.

15. The vehicular control system of claim 13, wherein said rearward-viewing camera comprises a rear backup camera of the equipped vehicle.

16. The vehicular control system of claim 15, wherein a birds-eye view system of the equipped vehicle at least comprises said front camera, said rearward-viewing camera, said driver side-viewing camera and said passenger side-viewing camera.

17. The vehicular control system of claim 15, wherein said ECU generates an output provided to a video display device of the equipped vehicle, said video display device comprising a video display screen viewable by a driver of the equipped vehicle, and wherein said video display screen displays video images derived, at least in part, from image data captured by the imaging sensor of one or more cameras selected from the group consisting of (i) said front camera, (ii) said rearward-viewing camera, (iii) said driver side-viewing camera and (iv) said passenger side-viewing camera.

18. The vehicular control system of claim 17, wherein said ECU connects with said video display device via a sixth coaxial cable.

19. The vehicular control system of claim 18, wherein said output comprises an LVDS output and is carried from said ECU to said video display device via said sixth coaxial cable.

20. The vehicular control system of claim 13, wherein the front portion of the equipped vehicle comprises a portion of a front grille of the equipped vehicle.

21. The vehicular control system of claim 13, wherein the imaging sensor of said front camera comprises a megapixel array having at least one million photosensors arranged in multiple columns and multiple rows.

22. The vehicular control system of claim 1, wherein (i) electrical power for said rearward-viewing camera is carried from said ECU to said rearward-viewing camera via said second coaxial cable, (ii) electrical power for said driver side-viewing camera is carried from said ECU to said driver side-viewing camera via said third coaxial cable and (iii) electrical power for said passenger side-viewing camera is carried from said ECU to said passenger side-viewing camera via said fourth coaxial cable.

23. The vehicular control system of claim 1, wherein said ECU connects with a vehicle communication bus of the equipped vehicle.

24. The vehicular control system of claim 23, wherein said vehicle communication bus of the equipped vehicle comprises a CAN bus.

25. The vehicular control system of claim 23, wherein the imaging sensor of said forward-viewing camera comprises a megapixel array having at least one million photosensors arranged in multiple columns and multiple rows.

26. The vehicular control system of claim 23, wherein the imaging sensor of said rearward-viewing camera comprises a megapixel array having at least one million photosensors arranged in multiple columns and multiple rows.

27. The vehicular control system of claim 23, wherein the imaging sensor of said driver side-viewing camera comprises a megapixel array having at least one million photosensors arranged in multiple columns and multiple rows.

28. The vehicular control system of claim 23, wherein the imaging sensor of said passenger side-viewing camera comprises a megapixel array having at least one million photosensors arranged in multiple columns and multiple rows.

29. A vehicular control system, said vehicular control system comprising:
a forward-viewing camera disposed at a portion of an in-cabin side of a windshield of a vehicle equipped with said vehicular control system;
said forward-viewing camera comprising an imaging sensor;
wherein, with said forward-viewing camera attached at the vehicle windshield, the imaging sensor of said forward-viewing camera views forward through the vehicle windshield;
wherein the imaging sensor of said forward-viewing camera comprises a megapixel array having at least one million photosensors arranged in multiple columns and multiple rows;
wherein the imaging sensor of said forward-viewing camera has a forward field of view exterior of the equipped vehicle and is operable to capture image data;
a rearward-viewing camera disposed at a rear portion of the equipped vehicle;
said rearward-viewing camera comprising an imaging sensor;
wherein the imaging sensor of said rearward-viewing camera comprises a megapixel array having at least one million photosensors arranged in multiple columns and multiple rows;
wherein the imaging sensor of said rearward-viewing camera has a rearward field of view exterior of the equipped vehicle and is operable to capture image data;
wherein said rearward-viewing camera comprises a first low-voltage differential signaling (LVDS) serializer;
wherein a driver side-viewing camera is disposed at a driver-side portion of the equipped vehicle;
wherein said driver side-viewing camera comprises an imaging sensor;
wherein the imaging sensor of said driver side-viewing camera comprises a megapixel array having at least one million photosensors arranged in multiple columns and multiple rows;
wherein said driver side-viewing camera comprises a second LVDS serializer;
wherein a passenger side-viewing camera is disposed at a passenger-side portion of the equipped vehicle;
wherein said passenger side-viewing camera comprises an imaging sensor;
wherein the imaging sensor of said passenger side-viewing camera comprises a megapixel array having at least one million photosensors arranged in multiple columns and multiple rows;
wherein said passenger side-viewing camera comprises a third LVDS serializer;
wherein at least one radar sensor is disposed at the equipped vehicle;
an electronic control unit (ECU);
wherein said ECU comprises (i) a first LVDS de-serializer, (ii) a second LVDS de-serializer, (iii) a third LVDS de-serializer, (iv) an electrical power source and (v) a data processor;
wherein said rearward-viewing camera connects with said ECU via a first coaxial cable;
wherein said driver side-viewing camera connects with said ECU via a second coaxial cable;
wherein said passenger side-viewing camera connects with said ECU via a third coaxial cable;
wherein signal communication between said rearward-viewing camera and said ECU via said first coaxial cable is bidirectional;
wherein signal communication between said driver side-viewing camera and said ECU via said second coaxial cable is bidirectional;
wherein signal communication between said passenger side-viewing camera and said ECU via said third coaxial cable is bidirectional;
wherein image data captured by the imaging sensor of said rearward-viewing camera is converted at said first LVDS serializer to a first image signal that is carried to said ECU via said first coaxial cable;
wherein image data captured by the imaging sensor of said driver side-viewing camera is converted at said second LVDS serializer to a second image signal that is carried to said ECU via said second coaxial cable;
wherein image data captured by the imaging sensor of said passenger side-viewing camera is converted at said third LVDS serializer to a third image signal that is carried to said ECU via said third coaxial cable;
wherein the first image signal is de-serialized at said first LVDS de-serializer of said ECU;
wherein the second image signal is de-serialized at said second LVDS de-serializer of said ECU;
wherein the third image signal is de-serialized at said third LVDS de-serializer of said ECU;
wherein said vehicular control system detects an object that is present exterior of the equipped vehicle and that is approaching a vehicle side-door of the equipped vehicle; and
wherein, responsive at least in part to said vehicular control system determining that the approaching object may hit the vehicle side-door if the vehicle side-door was opened, said vehicular control system precludes opening of the vehicle side-door in order to provide a vehicle door opening protection function.

30. The vehicular control system of claim 29, wherein the approaching object comprises a bicyclist.

31. The vehicular control system of claim 30, wherein said vehicular control system at least one selected from the group consisting of (i) alerts a driver of the equipped vehicle to not open the vehicle side-door until the detected object passes the vehicle side-door and (ii) alerts a passenger of the equipped vehicle to not open the vehicle side-door until the detected object passes the vehicle side-door.

32. The vehicular control system of claim 30, wherein said vehicular control system detects the object approaching the vehicle side-door of the equipped vehicle responsive, at least in part, to at least one selected from the group consisting of (i) processing at said ECU of the de-serialized second image signal and (ii) processing at said ECU of the de-serialized third image signal.

33. The vehicular control system of claim 29, wherein said vehicular control system at least one selected from the group consisting of (i) locks the vehicle side-door until the detected object passes the vehicle side-door and (ii) limits opening of the vehicle side-door until the detected object passes the vehicle side-door.

34. The vehicular control system of claim 33, wherein said vehicular control system detects the object approaching the vehicle side-door of the equipped vehicle when the equipped vehicle is not moving.

35. The vehicular control system of claim 34, wherein said vehicular control system detects the object approaching the vehicle side-door of the equipped vehicle responsive, at least in part, to one selected from the group consisting of (i) processing at said ECU of the de-serialized second image signal and (ii) processing at said ECU of the de-serialized third image signal.

36. The vehicular control system of claim 29, wherein said vehicular control system detects the object approaching the vehicle side-door of the equipped vehicle when the equipped vehicle is not moving.

37. The vehicular control system of claim 29, wherein said forward-viewing camera comprises a fourth LVDS serializer, and wherein said ECU comprises a fourth LVDS de-serializer, and wherein said forward-viewing camera connects with said ECU via a fourth coaxial cable, and wherein image data captured by the imaging sensor of said forward-viewing camera is converted at said fourth LVDS serializer to a fourth image signal that is carried to said ECU via said fourth coaxial cable, and wherein the fourth image signal is de-serialized at said fourth LVDS de-serializer of said ECU, and wherein the de-serialized first image signal is processed at said ECU to detect a vehicle present in the forward field of view of said forward-viewing camera.

38. The vehicular control system of claim 37, wherein signal communication between said forward-viewing camera and said ECU via said fourth coaxial cable is bidirectional.

39. The vehicular control system of claim 38, wherein said data processor comprises an image processing chip.

40. The vehicular control system of claim 39, wherein, responsive at least in part to processing at said ECU of the de-serialized fourth image signal, said vehicular control system, at least in part, controls an automatic emergency braking system of the equipped vehicle.

41. The vehicular control system of claim 37, wherein a surround vision system of the equipped vehicle at least comprises said forward-viewing camera, said driver side-viewing camera and said passenger side-viewing camera.

42. The vehicular control system of claim 37, wherein said data processor comprises an image processing chip, and wherein said ECU connects with a vehicle communication bus of the equipped vehicle.

43. The vehicular control system of claim 42, wherein said vehicle communication bus of the equipped vehicle comprises a CAN bus, and wherein at least one lidar sensor is disposed at the equipped vehicle.

44. The vehicular control system of claim 29, wherein, at least in part responsive to processing at said ECU of the de-serialized first image signal, said vehicular control system determines presence of an object in the rearward field of view of said rearward-viewing camera.

45. The vehicular control system of claim 44, wherein, at least in part responsive to processing at said ECU of the de-serialized first image signal, said vehicular control system distinguishes a child from an adult.

46. The vehicular control system of claim 29, wherein said vehicular control system processes sequential frames of captured image data to generate a three dimensional map along a road on which the equipped vehicle is traveling.

47. The vehicular control system of claim 29, wherein a front camera is disposed at a front portion of the equipped vehicle, and wherein said front camera comprises an imaging sensor comprising a megapixel array having at least one million photosensors arranged in multiple columns and multiple rows, the imaging sensor of said front camera having a forward field of view exterior of the equipped vehicle and operable to capture image data, and wherein said front camera comprises a front-camera LVDS serializer, and wherein said ECU comprises a front-camera LVDS de-serializer, and wherein said front camera connects with said ECU via a front-camera coaxial cable, and wherein image data captured by the imaging sensor of said front camera is converted at said front-camera LVDS serializer to a front-camera image signal that is carried to said ECU via said front-camera coaxial cable, and wherein the front-camera image signal is de-serialized at said front-camera LVDS de-serializer of said ECU.

48. The vehicular control system of claim 47, wherein a birds-eye view system of the equipped vehicle at least comprises said front camera, said rearward-viewing camera, said driver side-viewing camera and said passenger side-viewing camera.

49. The vehicular control system of claim 47, wherein (i) electrical power for said rearward-viewing camera is carried from said ECU to said rearward-viewing camera via said first coaxial cable, (ii) electrical power for said driver side-viewing camera is carried from said ECU to said driver side-viewing camera via said second coaxial cable, (iii) electrical power for said passenger side-viewing camera is carried from said ECU to said passenger side-viewing camera via said third coaxial cable and (iv) electrical power for said front camera is carried from said ECU to said front camera via said front-camera coaxial cable.

50. The vehicular control system of claim 49, wherein said ECU generates an output provided to a video display device of the equipped vehicle, said video display device comprising a video display screen viewable by a driver of the equipped vehicle, and wherein said video display screen displays video images derived, at least in part, from image data captured by the imaging sensor of one or more cameras selected from the group consisting of (i) said front camera, (ii) said rearward-viewing camera, (iii) said driver side-viewing camera and (iv) said passenger side-viewing camera.

51. The vehicular control system of claim 50, wherein said ECU connects with said video display device via a video-display coaxial cable, and wherein said output comprises an LVDS output and is carried from said ECU to said video display device via said video-display coaxial cable.

52. The vehicular control system of claim 47, wherein the front portion of the equipped vehicle comprises a portion of a front grille of the equipped vehicle.

53. The vehicular control system of claim 47, wherein said vehicular control system provides a child presence detection function that at least one selected from the group consisting of (i) detects presence of a child exterior of the equipped vehicle at least in part via processing at said ECU of the de-serialized first image signal, (ii) detects presence of a child exterior of the equipped vehicle at least in part via processing at said ECU of the de-serialized second image signal, (iii) detects presence of a child exterior of the equipped vehicle at least in part via processing at said ECU of the de-serialized third image signal and (iv) detects presence of a child exterior of the equipped vehicle at least in part via processing at said ECU of the de-serialized front-camera image signal.

54. The vehicular control system of claim 29, wherein said vehicular control system provides a child presence detection function that at least one selected from the group consisting of (i) detects presence of a child exterior of the equipped vehicle at least in part via processing at said ECU of the de-serialized first image signal, (ii) detects presence of a child exterior of the equipped vehicle at least in part via processing at said ECU of the de-serialized second image signal and (iii) detects presence of a child exterior of the equipped vehicle at least in part via processing at said ECU of the de-serialized third image signal.

55. The vehicular control system of claim 29, wherein said rearward-viewing camera comprises a rear backup camera of the equipped vehicle, and wherein (i) electrical power for said rearward-viewing camera is carried from said ECU to said rearward-viewing camera via said first coaxial cable, (ii) electrical power for said driver side-viewing camera is carried from said ECU to said driver side-viewing camera via said second coaxial cable and (iii) electrical power for said passenger side-viewing camera is carried from said ECU to said passenger side-viewing camera via said third coaxial cable.

56. A vehicular control system, said vehicular control system comprising:
a forward-viewing camera disposed at a portion of an in-cabin side of a windshield of a vehicle equipped with said vehicular control system;
said forward-viewing camera comprising an imaging sensor;
wherein, with said forward-viewing camera attached at the vehicle windshield, the imaging sensor of said forward-viewing camera views forward through the vehicle windshield;
wherein the imaging sensor of said forward-viewing camera comprises a megapixel array having at least one million photosensors arranged in multiple columns and multiple rows;
wherein the imaging sensor of said forward-viewing camera has a forward field of view exterior of the equipped vehicle and is operable to capture image data;
wherein a front camera is disposed at a front portion of the equipped vehicle;
wherein said front camera comprises an imaging sensor;
wherein the imaging sensor of said front camera comprises a megapixel array having at least one million photosensors arranged in multiple columns and multiple rows;
wherein said front camera comprises a first low-voltage differential signaling (LVDS) serializer;
a rearward-viewing camera disposed at a rear portion of the equipped vehicle;
said rearward-viewing camera comprising an imaging sensor;
wherein the imaging sensor of said rearward-viewing camera comprises a megapixel array having at least one million photosensors arranged in multiple columns and multiple rows;
wherein the imaging sensor of said rearward-viewing camera has a rearward field of view exterior of the equipped vehicle and is operable to capture image data;
wherein said rearward-viewing camera comprises a second LVDS serializer;
wherein said rearward-viewing camera comprises a rear backup camera of the equipped vehicle;
wherein a driver side-viewing camera is disposed at a driver-side portion of the equipped vehicle;
wherein said driver side-viewing camera comprises an imaging sensor;
wherein the imaging sensor of said driver side-viewing camera comprises a megapixel array having at least one million photosensors arranged in multiple columns and multiple rows;
wherein said driver side-viewing camera comprises a third LVDS serializer;
wherein a passenger side-viewing camera is disposed at a passenger-side portion of the equipped vehicle;
wherein said passenger side-viewing camera comprises an imaging sensor;
wherein the imaging sensor of said passenger side-viewing camera comprises a megapixel array having at least one million photosensors arranged in multiple columns and multiple rows;
wherein said passenger side-viewing camera comprises a fourth LVDS serializer;
an electronic control unit (ECU);
wherein said ECU comprises (i) a first LVDS de-serializer, (ii) a second LVDS de-serializer, (iii) a third LVDS de-serializer, (iv) a fourth LVDS de-serializer, (v) an electrical power source and (vi) a data processor;
wherein said front camera connects with said ECU via a first coaxial cable;
wherein said rearward-viewing camera connects with said ECU via a second coaxial cable;
wherein said driver side-viewing camera connects with said ECU via a third coaxial cable;
wherein said passenger side-viewing camera connects with said ECU via a fourth coaxial cable;
wherein signal communication between said front camera and said ECU via said first coaxial cable is bidirectional;
wherein signal communication between said rearward-viewing camera and said ECU via said second coaxial cable is bidirectional;
wherein signal communication between said driver side-viewing camera and said ECU via said third coaxial cable is bidirectional;
wherein signal communication between said passenger side-viewing camera and said ECU via said fourth coaxial cable is bidirectional;

wherein image data captured by the imaging sensor of said front camera is converted at said first LVDS serializer to a first image signal that is carried to said ECU via said first coaxial cable;

wherein image data captured by the imaging sensor of said rearward-viewing camera is converted at said second LVDS serializer to a second image signal that is carried to said ECU via said second coaxial cable;

wherein image data captured by the imaging sensor of said driver side-viewing camera is converted at said third LVDS serializer to a third image signal that is carried to said ECU via said third coaxial cable;

wherein image data captured by the imaging sensor of said passenger side-viewing camera is converted at said fourth LVDS serializer to a fourth image signal that is carried to said ECU via said fourth coaxial cable;

wherein the first image signal is de-serialized at said first LVDS de-serializer of said ECU;

wherein the second image signal is de-serialized at said second LVDS de-serializer of said ECU;

wherein the third image signal is de-serialized at said third LVDS de-serializer of said ECU;

wherein the fourth image signal is de-serialized at said fourth LVDS de-serializer of said ECU; and wherein (i) electrical power for said front camera is carried from said ECU to said front camera via said first coaxial cable, (ii) electrical power for said rearward-viewing camera is carried from said ECU to said rearward-viewing camera via said second coaxial cable, (iii) electrical power for said driver side-viewing camera is carried from said ECU to said driver side-viewing camera via said third coaxial cable and (iv) electrical power for said passenger side-viewing camera is carried from said ECU to said passenger side-viewing camera via said fourth coaxial cable.

57. The vehicular control system of claim 56, wherein said vehicular control system processes sequential frames of captured image data to generate a three dimensional map along a road on which the equipped vehicle is traveling.

58. The vehicular control system of claim 56, wherein said vehicular control system at least in part controls a cross traffic alert function that utilizes at least one selected from the group consisting of (i) processing at said ECU of the de-serialized first image signal and (ii) processing at said ECU of the de-serialized second image signal.

59. The vehicular control system of claim 56, wherein said vehicular control system detects a bicyclist traveling along a road on which the equipped vehicle is traveling.

60. The vehicular control system of claim 56, wherein, at least in part responsive to processing at said ECU of at least one selected from the group consisting of (i) the de-serialized second image signal, (ii) the de-serialized third image signal and (iii) the de-serialized fourth image signal, said vehicular control system detects an object approaching the equipped vehicle from rearward of the equipped vehicle.

61. The vehicular control system of claim 60, wherein, responsive at least in part to a determination by said vehicular control system that the rearward approaching object may impact a door of the equipped vehicle if it is opened, said vehicular control system limits opening of the vehicle door.

62. The vehicular control system of claim 61, wherein the rearward approaching object comprises a bicyclist.

63. The vehicular control system of claim 56, wherein, at least in part responsive to processing at said ECU of the de-serialized second image signal, said vehicular control system determines presence of an object in the rearward field of view of said rearward-viewing camera.

64. The vehicular control system of claim 63, wherein, at least in part responsive to processing at said ECU of the de-serialized second image signal, said vehicular control system distinguishes a child from an adult.

65. The vehicular control system of claim 56, wherein the front portion of the equipped vehicle comprises a portion of a front grille of the equipped vehicle.

66. The vehicular control system of claim 65, wherein said ECU connects with a vehicle communication bus of the equipped vehicle.

67. The vehicular control system of claim 66, wherein said vehicle communication bus of the equipped vehicle comprises a CAN bus.

68. The vehicular control system of claim 56, wherein a birds-eye view system of the equipped vehicle at least comprises said front camera, said rearward-viewing camera, said driver side-viewing camera and said passenger side-viewing camera.

69. The vehicular control system of claim 68, wherein said ECU generates an output provided to a video display device of the equipped vehicle, said video display device comprising a video display screen viewable by a driver of the equipped vehicle, and wherein said video display screen displays video images derived, at least in part, from image data captured by the imaging sensor of one or more cameras selected from the group consisting of (i) said front camera, (ii) said rearward-viewing camera, (iii) said driver side-viewing camera and (iv) said passenger side-viewing camera.

70. The vehicular control system of claim 69, wherein said ECU connects with said video display device via a fifth coaxial cable.

71. The vehicular control system of claim 70, wherein said output comprises an LVDS output and is carried from said ECU to said video display device via said fifth coaxial cable.

72. The vehicular control system of claim 56, wherein said ECU connects with a vehicle communication bus of the equipped vehicle.

73. The vehicular control system of claim 72, wherein said vehicle communication bus of the equipped vehicle comprises a CAN bus.

74. The vehicular control system of claim 72, wherein at least one radar sensor is disposed at the equipped vehicle.

75. The vehicular control system of claim 74, wherein at least one lidar sensor is disposed at the equipped vehicle.

76. The vehicular control system of claim 72, wherein said forward-viewing camera connects with said ECU via a forward-viewing-camera coaxial cable.

77. The vehicular control system of claim 76, wherein said forward-viewing camera comprises a forward-viewing-camera LVDS serializer, and wherein said ECU comprises a forward-viewing-camera LVDS de-serializer, and wherein image data captured by the imaging sensor of said forward-viewing camera is converted at said forward-viewing-camera LVDS serializer to a forward-viewing-camera image signal that is carried to said ECU via said forward-viewing-camera coaxial cable, and wherein the forward-viewing-camera image signal is de-serialized at said forward-viewing-camera LVDS de-serializer of said ECU.

78. The vehicular control system of claim 77, wherein, responsive at least in part to processing at said ECU of the de-serialized forward-viewing-camera image signal, said vehicular control system detects a vehicle present in the forward field of view of said forward-viewing camera.

79. The vehicular control system of claim 78, wherein, responsive at least in part to a determination by said vehicular control system that the equipped vehicle and the detected vehicle may collide, said vehicular control system, at least in part, controls a braking system of the equipped vehicle.

80. The vehicular control system of claim 79, wherein the braking system of the equipped vehicle provides different braking functions depending on the environment in which the equipped vehicle is driven.

81. The vehicular control system of claim 78, wherein signal communication between said forward-viewing camera and said ECU via said forward-viewing-camera coaxial cable is bidirectional.

82. The vehicular control system of claim 77, wherein, responsive at least in part to processing at said ECU of the de-serialized forward-viewing-camera image signal, said vehicular control system, at least in part, controls an automatic emergency braking system of the equipped vehicle.

83. The vehicular control system of claim 77, wherein a surround vision system of the equipped vehicle at least comprises said forward-viewing camera, said driver side-viewing camera and said passenger side-viewing camera.

84. The vehicular control system of claim 77, wherein a birds-eye view system of the equipped vehicle at least comprises said front camera, said rearward-viewing camera, said driver side-viewing camera and said passenger side-viewing camera.

85. The vehicular control system of claim 77, wherein said data processor comprises an image processing chip.

86. The vehicular control system of claim 56, wherein, responsive at least in part to a determination by said vehicular control system that a rearward approaching object may impact a door of the equipped vehicle if it is opened, said vehicular control system limits opening of the vehicle door.

87. The vehicular control system of claim 86, wherein the rearward approaching object comprises a bicyclist.

88. The vehicular control system of claim 86, wherein at least one radar sensor is disposed at the equipped vehicle.

89. The vehicular control system of claim 88, wherein at least one lidar sensor is disposed at the equipped vehicle.

* * * * *